US007741575B2

(12) United States Patent
Bowers et al.

(10) Patent No.: US 7,741,575 B2
(45) Date of Patent: Jun. 22, 2010

(54) MAIL PIECE CONSOLIDATION AND ACCOUNTABILITY USING ADVANCED TRACKING METHODS

(75) Inventors: Brian C. Bowers, Mundelein, IL (US); Steven J. Krejcik, Brookfield, IL (US); Walter S. Conard, Lake Villa, IL (US); Michael R. Swift, Libertyville, IL (US)

(73) Assignee: Bowe Bell + Howell Company, Durham, NC (US)

( * ) Notice: Subject to any disclaimer, the term of this patent is extended or adjusted under 35 U.S.C. 154(b) by 715 days.

(21) Appl. No.: 11/199,259

(22) Filed: Aug. 9, 2005

(65) Prior Publication Data

US 2006/0108266 A1 May 25, 2006

Related U.S. Application Data

(60) Provisional application No. 60/629,407, filed on Nov. 22, 2004.

(51) Int. Cl.
*G06K 9/00* (2006.01)

(52) U.S. Cl. ........................ 209/584; 209/583; 382/101

(58) Field of Classification Search ................. 209/583, 209/584
See application file for complete search history.

(56) References Cited

U.S. PATENT DOCUMENTS 5,419,440 A 5/1995 Picoult
5,475,603 A 12/1995 Korowotny
6,101,487 A 8/2000 Yeung
6,135,292 A 10/2000 Pettner
6,303,889 B1 * 10/2001 Hayduchok et al. ......... 209/584
6,501,041 B1 * 12/2002 Burns et al. ................. 209/584
6,655,683 B2 12/2003 Engarto et al.
6,674,038 B1 1/2004 Latta
6,697,500 B2 * 2/2004 Woolston et al. ............ 382/101
6,749,194 B2 6/2004 Hanson et al.
6,793,136 B2 9/2004 Wells et al.

(Continued)

FOREIGN PATENT DOCUMENTS

EP 0 481 569 A 4/1992

OTHER PUBLICATIONS

European Search Report issued in European Patent Application No. EP 05025368.1-2307 dated on Jan. 27, 2009.

(Continued)

*Primary Examiner*—Gene Crawford
*Assistant Examiner*—Terrell H Matthews
(74) *Attorney, Agent, or Firm*—McDermott Will & Emery LLP

(57) ABSTRACT

Mail processing methods and techniques for sorting and commingling mail from various mail sources including the tracking of the mail pieces through processing. Such tracking entails uniquely identifying each mail piece, received in batches from the mail sources, and recording the unique identification of each mail piece. The received mail is sorted and commingled in a first pass, to form first collections, and each first collection is loaded into a uniquely identified mail container. For each respective mail piece, the tracking entails recording an association of the unique identification of one of the mail containers into which it is likely the respective mail piece is sorted on the first pass. After processing is complete, postal and client reports can be adjusted based on actual first pass counts.

17 Claims, 12 Drawing Sheets

U.S. PATENT DOCUMENTS

| | | | | |
|---|---|---|---|---|
| 6,998,558 | B2 * | 2/2006 | Forella et al. | 209/584 |
| 7,048,191 | B2 * | 5/2006 | Park et al. | 235/462.01 |
| 7,397,010 | B2 * | 7/2008 | Wilke | 209/584 |
| 2002/0053533 | A1 | 5/2002 | Brehm et al. | |
| 2003/0200113 | A1 | 10/2003 | Latta | |
| 2004/0049316 | A1 | 3/2004 | Pintsov et al. | |
| 2004/0054552 | A1 | 3/2004 | Amonette et al. | |
| 2004/0188522 | A1 | 9/2004 | Ashaari | |
| 2005/0216119 | A1 * | 9/2005 | Hamilton | 700/224 |
| 2006/0102529 | A1 * | 5/2006 | Wilke | 209/584 |

OTHER PUBLICATIONS

European Search Report issued in European Patent Application No. EP 05025368.1 dated Jul. 6, 2009.

Partial European Search Report issued in European Patent Application No. 05 02 5368 dated Dec. 18, 2008.

* cited by examiner

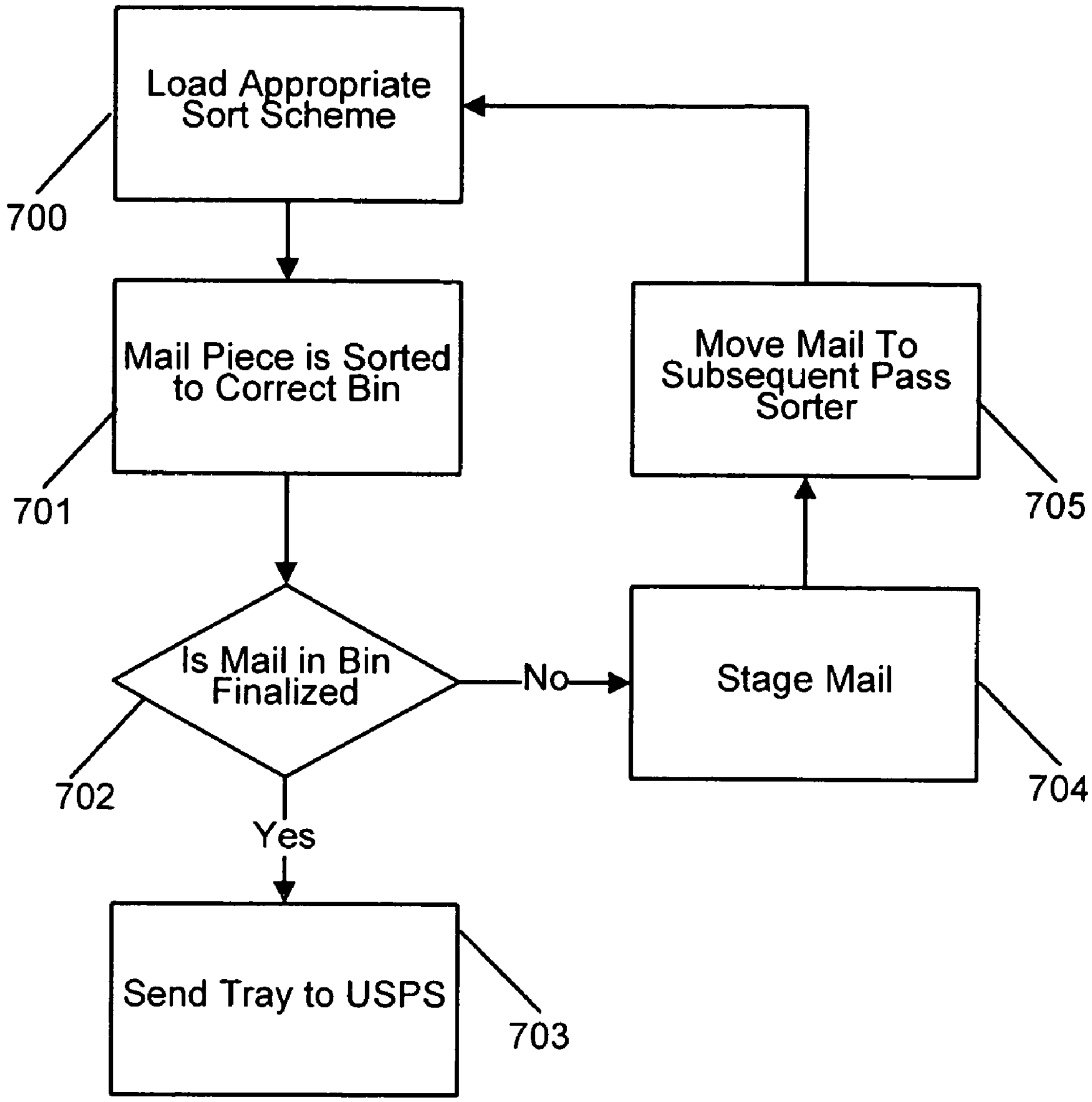
Fig. 12 – Prior Art

MAIL PIECE CONSOLIDATION AND ACCOUNTABILITY USING ADVANCED TRACKING METHODS

RELATED APPLICATION

This application claims the benefit of U.S. Provisional Application No. 60/629,407 Filed Nov. 22, 2004 entitled "Methods for Mail Piece Consolidation and Accountability Using Advanced Tracking Methods," the disclosure of which also is entirely incorporated herein by reference.

TECHNICAL FIELD

The present subject matter relates to techniques and equipment to efficiently process mail prior to delivery to a postal authority in order to qualify for postage discounts based on the work performed and to accurately track the mail piece processing.

BACKGROUND

In 1989 the United States Postal Service (USPS) started a work-sharing program, by which the Service intended to increase the amount of bar coded mail and reduce operational costs. To promote this end, private mailers were offered incentives to purchase high-speed Multi-Line Optical Character Reader (MLOCR) equipment and bar code and commingle multiple mail streams. Certain make-up requirements were established that facilitated the input of the barcoded mail into the USPS processing stream. For performing this service, private entities were given a discount to process the mail. Volume discounts were instituted which provided incentives to private entities to increase volumes, thus paying a lower cost per piece in postage dollars. To achieve the required minimum volumes, presort entities were started which collected and commingled mail from many mailers.

While the USPS developed a complicated audit procedure, limitations of the production process prevented the USPS from performing an adequate audit on the mailings. One example of this is that a specific mail piece cannot be traced to a specific tray. Rather a mail piece was associated with a group of trays. Thus the acceptance clerk might have to look through 10,000 pieces of mail in over 60 trays to find one piece of mail.

FIG. 12 defines the normal steps required to perform a multiple pass sorting operation needed to meet USPS per-sort requirements. A batch of mail is loaded into a mail sorting apparatus at 700, and the apparatus will sort mail to a series of bins or packets based on a set of rules called a sort scheme in step 701. A bin could be set up to contain one zip code destination called a finalized bin, as will be checked at 702 in the sort scheme. Since a sorting apparatus will have a finite number of bins, and there are many USPS separations required, some of the mail will have to be batched into one bin, and re-run in a second or subsequent pass 705 to complete the sortation required to meet USPS requirements. A bin that is set up to receive multiple zip codes is called a repass bin. For example, a large mailing might require 3000 zip code separations of the mail in order to achieve the desired level of discount. In other words, mail destined for zip code 60513 will need to be separated and placed in a separate container from mail for zip code 60514. The sorting apparatus will make this separation by putting all mail with zip codes to 60513 in one bin and all mail with zip codes to 60514 in another bin.

A mail sorting apparatus typically could have around 253 bins. 242 bins would be assigned to finish zip codes. This finished mail can then be removed from the apparatus, mail from each finish bin can be put into a postal container at step 703, labeled and submitted to the postal authority. The mail for the other 2758 zip separations will be sorted into 11 repass bins 704 on the first pass. Each one of these bins will then be sorted out to 253 finalized separations in a subsequent pass 705 on the sorting apparatus. This mail is then placed in postal containers 703, labeled and is ready to be submitted to the postal authority.

Since the introduction of work sharing, there has not been an adequate method to audit a mailing, since the mail submitted to the USPS is commingled, i.e. pieces of different weight and pieces with different postage affixed (stamped, metered, permit . . . ) are all mixed together in the sorted mailing. Previously mail was separately grouped by the piece weight and by the type of postage affixed. Hence auditing was easier, since all pieces in the mail group being evaluated, had the same characteristics. The old method of weighing the mailing would no longer identify if the reported piece counts were accurate if there were variable weight pieces in the mailing.

Mail is randomly removed from the bin and put into trays. This limited the audit of a mail piece, since any piece could no longer be tracked back to a specific tray. The non-identical, commingled pieces have varying thickness so tray breaks could not be calculated by the system. Another issue is that USPS reports are calculated at the end of first pass. The computer system will produce the required subsequent pass schemes to sort the specific mail to meet the applicable postal regulations, but there are no regulations or methods in place today to confirm that the mail was actually sorted in subsequent passes. Mailers that do not have adequate capacity or time could claim the mail is sorted, and the computer generated reports would quantify this, yet the mail sortation may never have been completed.

Today a mailer will exchange mail between sites to increase volume densities and lower the average postage cost per piece. Sophisticated operational processes such as these were implemented by the mailing industry to increase operational efficiency and reduce the postage per piece. As processing complexity increases, so does the likelihood that errors will occur, which reduces the accuracy of the reports and increases the likelihood of large USPS fines and client billing problems.

A need still exists for improved mail processing techniques and equipment that resolve many of the quality issues and ensure accurate reporting for mail processed in a sorting operation. A related need exists for a method of processing and preparing a mailing that ensures a valid audit and USPS revenue protection.

SUMMARY

Sorting and commingling mail from various mail sources will include tracking of the mail pieces through the processing with a high degree of integrity. Such tracking entails uniquely identifying each mail piece, received in batches from the mail sources, and recording the unique identification of each mail piece. The received mail is sorted and commingled in a first pass, to form first collections, and each first collection is loaded into a uniquely identified mail container. For each respective mail piece, the tracking entails recording an association of the unique identification of one of the mail containers into which it is likely the respective mail piece is sorted on the first pass.

The exact accuracy of the association of each mail piece to a container will vary with the system implementation. For example, with a system that provides a marker at appropriate break points, the association may be precise in almost all cases. In other implementations without the marker or other means to insure that collections are accurately swept in the containers, the tracking accuracy may off by one tray or so, for pieces at or around the break points.

In the examples, the first collections from the containers are sorted on a subsequent pass. The additional sortation may be at the same location, e.g. on the same or a different sorting system, or the additional sortation may be performed at a remote location. Typically, additional sorting enables the parties to share the benefit of additional levels of postal discounts.

In such instances, the sorting, commingling and tracking methodology further involves sorting mail pieces from at least some of the mail containers, in a subsequent pass, into a subsequent collections based on intended destination information and in accord with postal authority rules. For each mail piece sorted into a subsequent collection, the processing entails recording a result of the sorting in the subsequent pass.

The tracking data in the recordings can then be processed to generate a report of processing results for substantially all of the received mail pieces. Techniques are discussed later to reconcile the reports to reflect any losses or additions of mail pieces. The report may enable verification of sorting integrity for postage accounting. As another example, the report may provide verification of mail piece characteristics that effect postage due, such as thickness, weight, type of postage affixed, etc. for each finished mail piece. The characteristic data may be either automatically measured, entered by the operator or read off the mail piece during first pass sorting and tracked with the mail piece throughout each subsequent pass. In addition or as an alternative, the data processing can provide a report that informs the mail clients as to the processing of their mail pieces through one or more of the sorting passes.

In the processing examples, the recordings comprise an electronic file of records of the mail pieces, such as a database or collection of flat files. The electronic file includes a record for each respective mail piece, which correlates the unique identification of the respective mail piece to the unique identification of one of the mail containers into which the respective mail piece is likely sorted on the first pass and/or to the result of the sorting in the subsequent pass for the respective mail piece.

The tracking technique can be used in applications wherein the mail containers comprise mail trays. In such an implementation, and a number of the mail trays are loaded onto a uniquely identified pallet, and the tracking further involves recording an association of each mail piece expected to be in each of those mail trays with the unique identification of the pallet. The pallet can then be transported to a remote location, for performance of the sorting in the subsequent pass, and the tracking will indicate the location of the pallet and thus the mail pieces en route and/or upon arrival at the second location.

Tracking data also enable validation of the identification of the mail trays loaded onto the identified pallet, before transporting the pallet. In this way, a data processing system can inform an operator if any of the mail trays loaded onto the identified pallet contain mail that should not be transported with the pallet to the remote location.

As noted earlier, the data processing can reconcile the reports to reflect any losses or additions of mail pieces. For example, if the piece count after the subsequent pass does not match the electronic file or a read occurs for mail piece identification not recorded in the electronic file, then the piece is rejected as a double from the first pass sorting operation. It is also possible to in interpolate data from the mail before and after a failed read or small group of failed reads to positively identify the pieces that are not successfully read in the subsequent pass operations by comparing with the expected data from the electronic file. In this later implementation, the processing might entail detecting uniquely identified mail pieces from the mail containers, during the sorting in the subsequent pass, and detecting a mail piece that is missing from one of the subsequent collections based on detection of unique identifications of mail pieces expected to precede and follow the missing mail piece in the one subsequent collection.

The present teachings also encompass a system for sorting mail from clients to obtain postal discounts. Such a system might utilize two sorting systems. A first sorting system at a first location, uniquely identifies each mail piece from batches of mail pieces received from the mail clients. The first sorting system also sorts and commingles the mail pieces from the batches of mail, in a first pass, into first collections, based on a first sort scheme. Typically, at least some of the first collections do not yet meet postal rules for a desired level of postage discounts. The second sorting system, at a different location, sorts and commingles mail pieces from the first collections that do not yet meet postal rules for the desired level of postage discounts received from the first sorting system together with additional mail pieces, in a subsequent pass. The subsequent pass sorting by the second system produces subsequent collections for transport to a postal delivery authority, that is to say sorted based on intended destination information so as to meet the postal rules for the desired level of postage discounts. A data processor system, in communication with the two sorting systems, maintains a record of each respective mail piece processed through the first and subsequent sorting systems based on unique identifications of mail pieces provided by the first sorting system. The data processor system stores data in each record regarding sorting of the respective mail piece in the first and subsequent sorting systems and of transport of the respective mail piece between the sorting systems. The stored data enables processing of the records to generate a report of sorting of all mail pieces.

Systems of this type may be used in a number of different business models, where it is desirable to cooperate in multi-pass sorting so as to gain an optimum postal discount. For example, the first and subsequent sorting systems may be implemented as cooperative service bureaus or mail production facilities. Alternatively, the first sorting system may be a system of one of a number of service bureaus or mail production facilities, in which case, the second sorting system is a hub system for receiving and consolidating mail initially sorted by systems of the service bureaus or mail production facilities.

In a disclosed example, the first sorting system includes a feeder for feeding individual mail pieces from the batches of mail pieces received from the mail clients, a reader for reading information from the individual mail pieces and a printer. The first system might also include a computer responsive to the reader, for deriving unique identifications for individual mail pieces where possible. The computer assigns unique identifications to any individual mail pieces for which information read from the mail piece can not be used for unique identification. Upon assigning such an identification, the computer controls the printer to print the assigned unique identification on the individual mail piece for which information read from the mail piece could not otherwise by used for unique identification of that piece.

As noted, it may be desirable in some implementations to capture data as to characteristics of the mail pieces. For example, the first sorting system may further include a thickness detector, for detecting thickness of individual mail pieces from the batches received from the mail clients.

Tracking implementations are also disclosed in which it is desirable to mark mail pieces in sorted collections for break points, e.g. to mark tray breaks at which points an operator should sweep sorted mail from a sort bin into a mail tray type container. For such implementations, the first sorting system would further include a marker for marking an identified mail piece as a break, when the computer determines that one of the first collections will reach a thickness break point for a combined grouping of mail to fit in a tray or tub.

The data processing for the tracking techniques disclosed herein may be implemented as methods, as one or more computer systems for performing the data processing and/or embodied in program products that might enable a data processing system to implement a sequence of appropriate steps.

For example a data processing method related to tracking processing of mail pieces of two or more mail clients, during mail sortation operations, might entail obtaining a unique identification of each respective mail piece from batches of mail pieces received from the mail clients. An individual record in a electronic file is created for each respective mail piece. Each such record includes the unique identification of the respective mail piece. The method also involves populating the mail piece records with information for tracking all of the identified mail pieces individually through and between multiple sortations prior to delivery to a postal authority.

It is also envisioned that the information for tracking, which is populated in each individual record, would include one or more of a tray identifier, a pallet identifier or staging area identifier, indicating a current location of the respective mail piece. In the multi-pass sorting examples, the tracking information populated in each individual record also indicates whether or not the respective mail piece has finished final sortation. The data also may indicate an association of the respective mail piece with one of the mail clients, from which the respective mail piece originated.

The data processing methodology may be used to tracking of placement of the mail pieces into a series of containers for transport and/or further processing. In such an example, the operation of populating of the mail piece records of the electronic file involves receiving a unique identification of a mail tray into which each respective mail piece is likely sorted from among identifications of mail trays into which the mail pieces are sorted after at least one of the sortations. The received unique identification of the mail tray into which each respective mail piece is likely sorted can then be associated with the record for the respective mail piece in the electronic file. In some cases where transport of trays is desired, the populating of the mail piece records also involves receiving a unique identification of a pallet, onto which identified mail trays are loaded. The identification of the pallet is then associated with each record of a respective mail piece in the identified mail trays loaded onto the pallet.

The unique identification of the respective mail piece included in each individual record may be data from one or more barcodes or any other unique identifying mark read from the respective mail piece. Alternatively, the identification number may be a unique sequence number assigned to the respective mail piece. In addition or in place of the bar codes, it is envisioned that the identification may utilize data read from RFID tags or other identification technologies.

Reading technologies for Radio Frequency Identification (RFID) tags or RFID codes imbedded in the paper can be added to read the required data directly from the code or read an unique identifier from the code that can be referenced to an electronic file to acquire the necessary data about the mail piece. A larger RFID code can be used to directly contain descriptive data about the mail piece, thus avoiding a data lookup. Alternatively, RFID sensitive ink can be used to mark the mail piece for identification. RFID codes can be used on mail piece, tray and tub tags and pallets. Both the paper, the ink and the detectors are available from INKODE Corporation. Similar tags may be used on or otherwise associated with mail containers, such as trays, tubs, sacks or pallets.

The tracking technology also encompasses a computer product comprising a electronic file for tracking processing of mail pieces of for mail clients, and a computer readable medium bearing the electronic file. The electronic file, for example, in the form of a database, comprises an individual record for each respective mail piece, processed from batches of mail pieces received from the mail clients. Each individual record includes a unique identification of the respective mail piece. Each individual record is configured for population with information for tracking of the respective mail piece, to enable processing of the file so as to track all of the mail pieces individually through and between multiple sortations.

As noted above, mail piece thickness may be used to determine and mark break points, in a manner which facilitates loading of mail containers while tracking mail pieces swept into the containers. Hence, another method disclosed herein involves sorting a stream of mail pieces into bins, based on information related to intended destinations of the mail pieces, and obtaining a value of thickness for one or more of the mail pieces. Based on the value of thickness, the method determines when thickness of mail pieces sorted into an identified one of the bins reaches a size corresponding to a capacity of a mail container. The method then entails providing a visible break mark on or in the mail sorted into the identified bin, at a location corresponding to the capacity of the mail container.

In examples of this latter method, the step of providing the break mark may involve printing the mark on an edge of a mail piece in the stream that will be sorted into the identified bin, at the location corresponding to the capacity of the mail container. Several techniques are disclosed for obtaining mail piece thickness and determining when thickness of sorted pieces in a bin reaches the size corresponding to the capacity of the mail container. For example, one approach involves measuring thickness of a sampling of mail pieces of the stream. With that approach, the determination involves calculating an average thickness of mail pieces from the measured thicknesses taken from the sampling of mail pieces; counting number of mail pieces sorted into the identified bin; and multiplying the average times the number of mail pieces sorted in the identified bin. The multiplication provides an estimate of overall thickness of mail pieces sorted into the identified bin.

In an alternative approach, thickness of each mail piece to be sorted into the identified bin is measured. In this implementation, the measured thicknesses are summed until the sum reaches the size corresponding to the capacity of a mail container.

As discussed above in relation to some of the basic tracking methods, the break determination technique may be used to update an electronic file of mail piece records with a unique tray identifier for each mail piece between marked mail pieces, to indicate the mail pieces loaded into a particular tray. For example, an operator could scan the tray identification for input into the database, or the operator could enter the tray identification through the GUI each time he/she starts or completes a tray.

Another feature of the tracking technology provides a unique method of building a pallet of sorted mail for transport to a postal facility. Each mail piece of each a number of collections of sorted mail pieces is identified, and each of the collections of mail pieces is loaded into a respective mail container. The method involves recording a unique identification of each respective mail container in association with unique identifications of the mail pieces that may be in the collection loaded into the respective container. When mail containers are loaded onto an identified pallet for transport to a postal processing facility, a unique identification of the pallet is recorded an association of with unique identifications of the containers loaded onto the pallet.

The associated tracking technique enables validating identifications of the mail containers loaded onto the identified pallet, before transporting the pallet. If any mail container on the identified pallet contains mail that should not be transported with the pallet to the remote location, the processing system can inform an operator.

A variety of technologies may be used to provide the identifications of the containers and the pallet. One or both types of identifications may be entered manually, e.g. using a keyboard or keypad. However, it is also envisioned that the identifications may be scanned in, e.g. use bar code scanners or optical character recognition, or using equipment to scan for other automatically detectable identifiers, such as RFIDs.

The method of building a pallet with identified contains may be combined with individual mail piece tracking. In such an implementation, the method would further involve obtaining and storing a unique identification of each mail piece in one of the collections. The unique identification of a mail container into which the one collection is loaded is stored in association with the unique identifications of the mail pieces loaded into the one mail container. Then, when the one mail container is loaded onto the pallet, the data processing system records an association of the unique identification of the pallet with the unique identifications of the mail pieces loaded into the one mail container.

The tracking techniques and the supporting technologies disclosed herein enable interpolation, that is to say the use of the data from the mail before and/or after a failed read or a small group of failed reads to positively identify one or more pieces that are not read, essentially by comparing actual data read in a subsequent path with the expected data from the electronic file. For example, if the piece count does not match the electronic file or a read occurs for an piece identification that is not in the database, then the piece is rejected as a double from the first pass sorting operation.

A mail sorting method, based on principles related to this interpolation technique involves reading data from each mail piece in a stream of mail pieces, for mail piece identification purposes. A record is created for each mail piece containing the data read from the respective mail piece as an identification for the respective mail piece. A first pass sorts the mail pieces from the stream into first collections. The method also involves indicating a result of the first sorting pass with regard to each respective mail pieces, in the record thereof. A subsequent pass performs sorting of the mail pieces from the first collections, into subsequent collections, based on intended destination information and in accordance with postal authority rules. The sorting in the subsequent pass includes reading the data from each of the mail pieces from the first collections that are sorted in that pass. Records of mail pieces from which data is read in the sorting in the subsequent pass are updated, to indicate finishing of sorting thereof through the subsequent pass. The records of mail pieces identified during subsequent pass sorting are processed to prepare a mail statement, reconciling mail pieces actually finished through the sorting in the subsequent pass.

The processing of the records of mail pieces identified during subsequent pass sorting, for example, can reflect any mail pieces added or lost between the sorting in the first pass and the sorting in the subsequent pass. In an example, the statement indicates postage due for delivery of finished mail pieces by a postal authority. In another example, the statement provides confirmation of presentations to a postal authority for delivery of the finished mail pieces.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 12 is a flow chart useful in understanding a typical prior sortation process flow.

DETAILED DESCRIPTION

Figure 1:
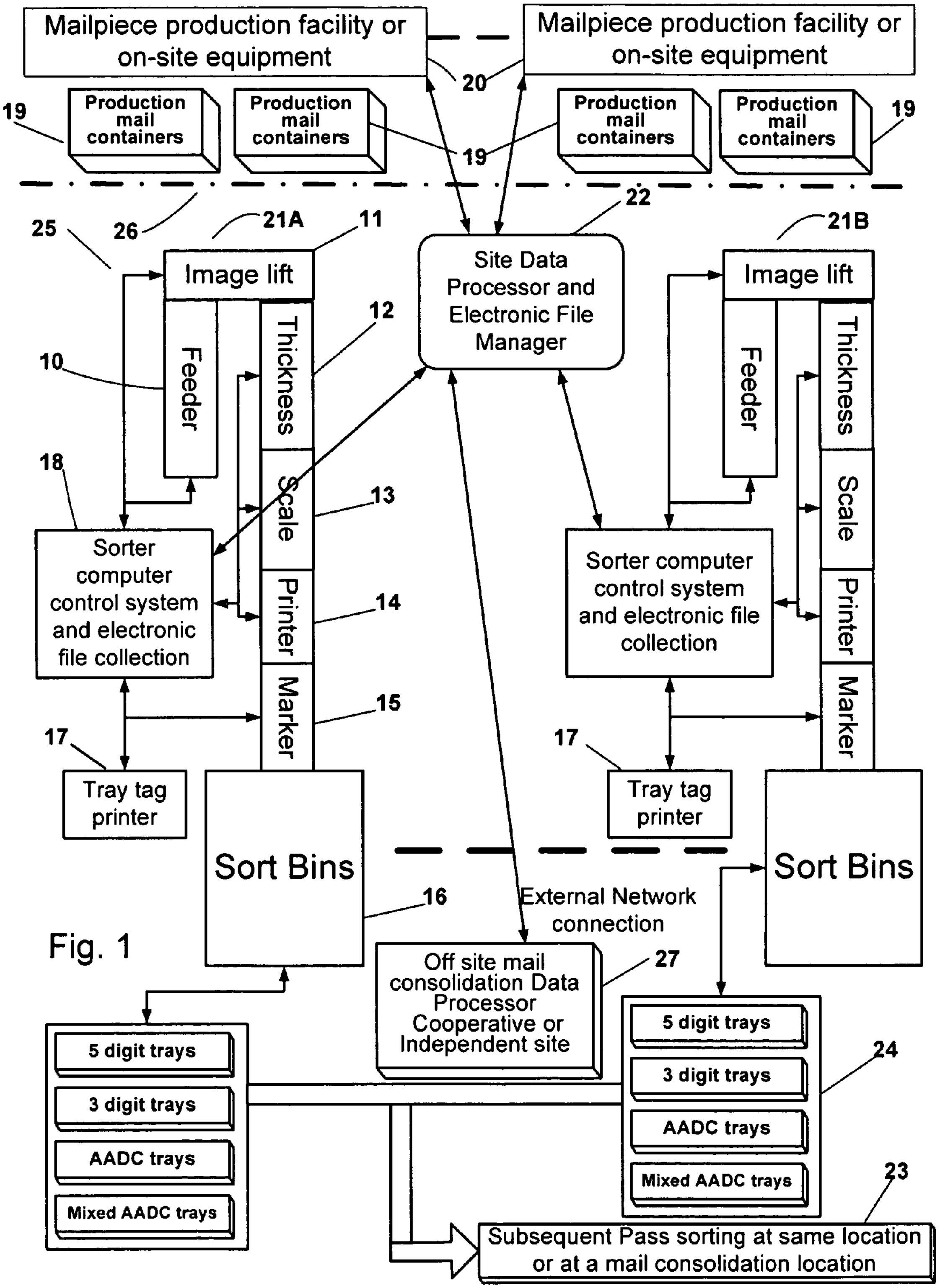
FIG. 1 is a functional block diagram depicting a generic sorting operation wherein the first pass sorting system is modeled after that of a Presort Bureau.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

In the mail processing and mail manufacturing industry, many terms are used to define various elements in the process. These terms are familiar to those skilled in the art. However, since the variety for terms that are used interchangeably is extensive, it is only possible to define some of the more common ones. A sorting system is equipment at any location where mail is sorted to meet postal regulations and earn workshare postage discounts. Examples of applications using such systems include a Presort Bureau, which could be a separate business or department or any facility in the private sector that uses a sorter to commingle mail from multiple sources. A letter shop or service bureau generally is a site that manufactures mail (inserting, wrapping . . . ) and performs sorting operations on the mail that they have manufactured for multiple clients and may also commingle mail from other sources in a manner analogous to a Presort Bureau. A captive shop (mail production facility) is generally a large business, such as a bank, financial institution, communications company (telcom) or other large institution that has chosen to manufacture all of their mail on site. They may perform sorting operations on site or send mail to presort or service bureaus. They also may dispatch mail to the postal authority directly.

Containers that store mail between production and sorting operations and for delivery to the postal authorities have numerous interchangeable terms. The most common examples include sack, tray, tub, mail container, pallet, and bin. Sometimes larger mail containers, such as pallets or USPS APCs are used to store a collection of smaller containers like trays, tubs or bins. Numerous references are made to the USPS (United States Postal Service) as an example of Postal Authorities or private posts that offer postage discounts or require per-processing of mail before it is accepted for processing and delivery. The use of USPS is not intended as a limitation to this postal authority.

In the mailing industry, there are many entities that are involved in creating mail for delivery. The "client" is the organization or individual that desires to send information through the mail to a recipient. The client frequently is responsible for paying the postage cost even if they do not actually transfer the funds to the postal authority. The client typically defines what material is to be mailed and often wants confirmation when the mail was delivered to the postal authority. One organization may contain multiple clients according to the usage in this disclosure. An example is a large financial institution that provides numerous credit card mailings for specialized cards like a hotel or airline cards. Each card line would be treated as a client. A source is an entity or system that supplies mail, e.g. from one or more clients, for processing by a particular sorting system.

These definitions are in no way exhaustive since those skilled in the art may use these terms interchangeably with many terms used by the industry.

The various techniques for processing mail to meet postal authority regulations and earn postage discounts that are disclosed herein relate to separate sites within an organization or separate mail processing enterprises cooperating by sharing mail and data in order to perform additional operations on the mail to earn further discounts beyond those that could be earned separately.

Reference now is made in detail to the examples illustrated in the accompanying drawings and discussed below. FIG. 1 illustrates the flow of work to and from a sorting system for performing first pass sorting.

Figure 2:
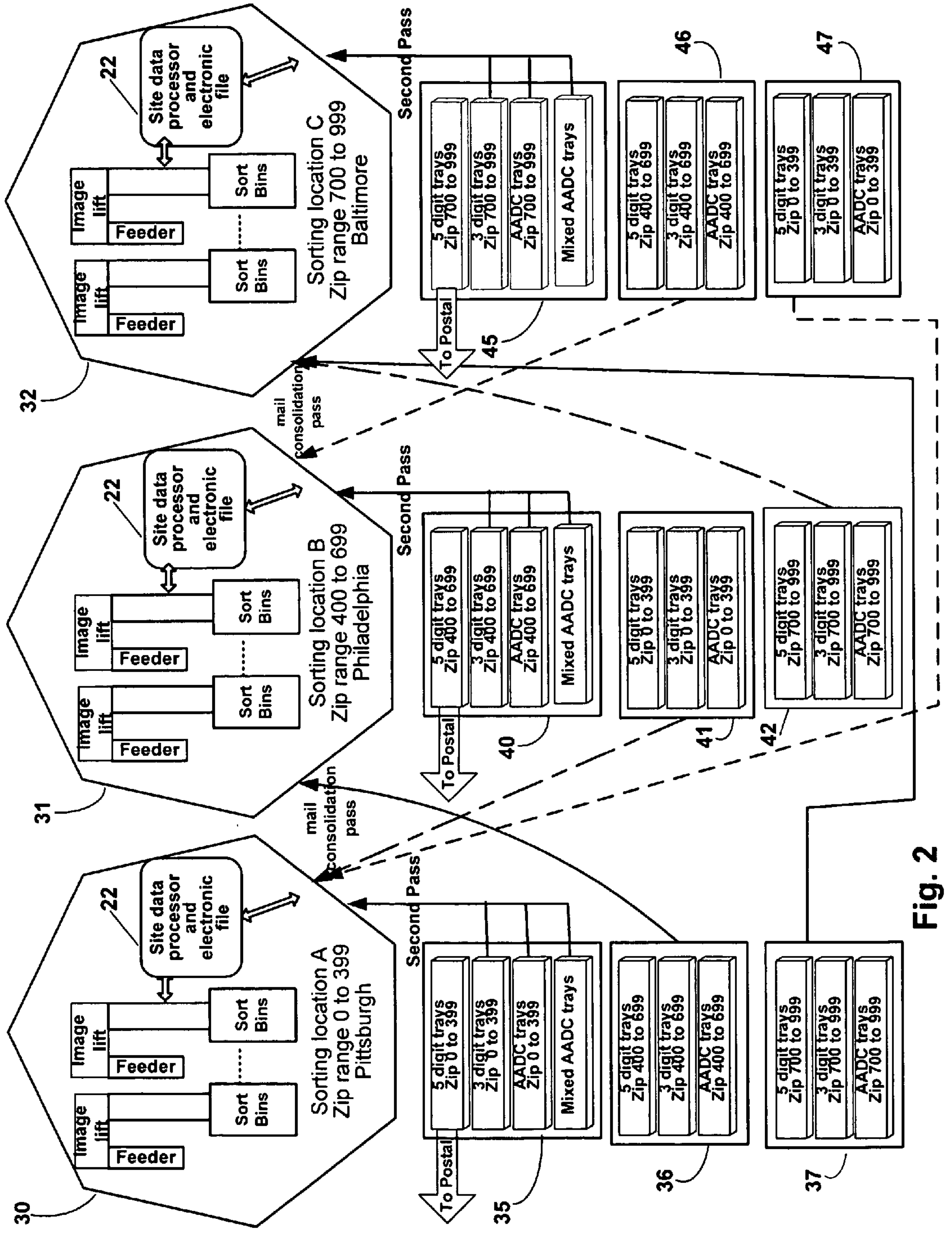
FIG. 2 is a cooperative mail consolidation site schematic, for the mail and data transfers that would occur in a low-density region or where the members are also not competitors.
Figure 3:
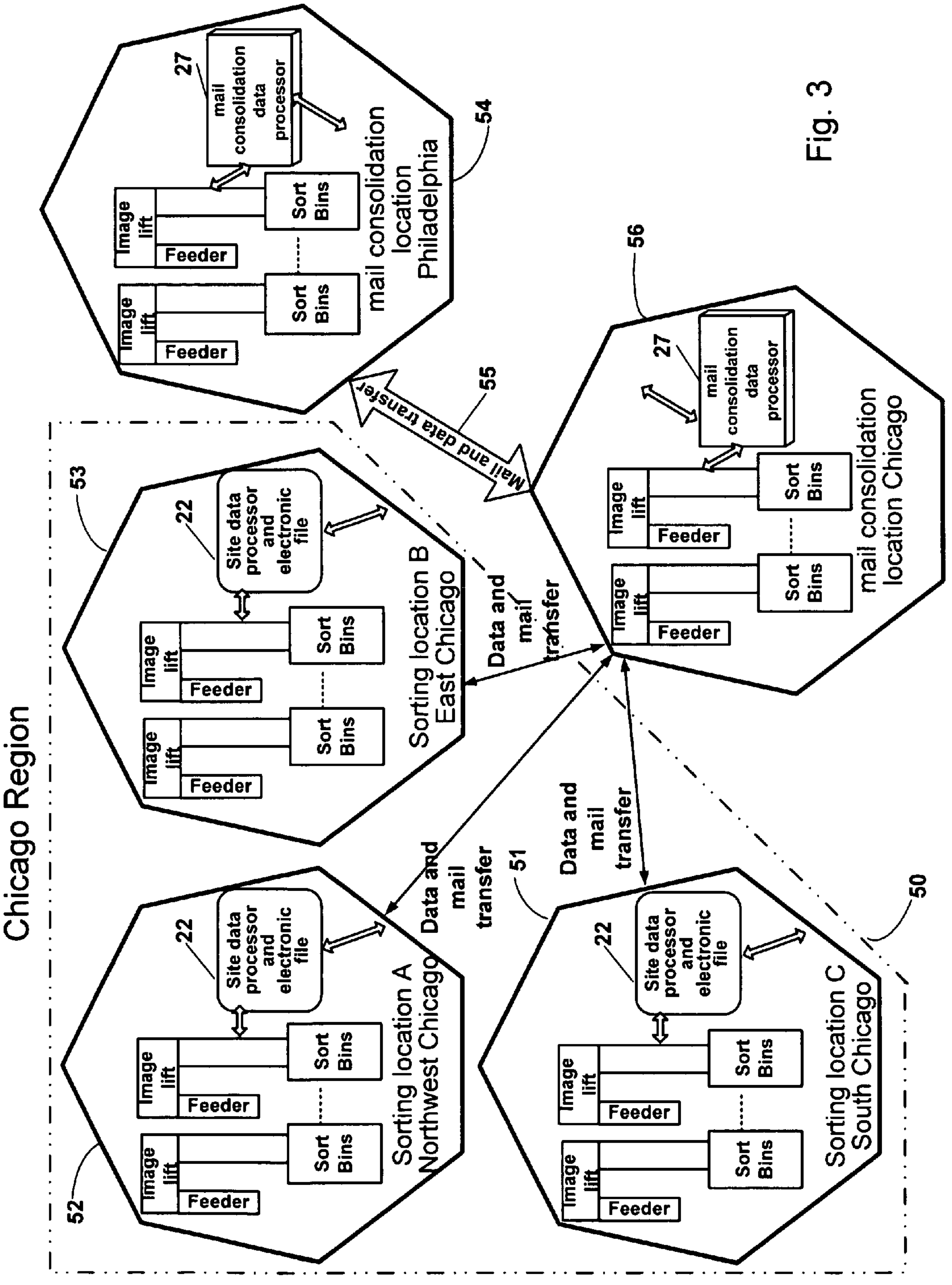
FIG. 3 is an independent mail consolidation site schematic, for Presorters that are in a competitive situation where an independent mail consolidation location will be established that is not affiliated with any of its members.

The mail consolidation process and advanced tracking is explained based on two general business models as shown in FIGS. 2 and 3. These cooperative and independent models are not intended to represent the only business arrangements for which this consolidation process and advanced tracking process applies. The methods for consolidating mail and tracking each piece for quality and reporting apply to any business model where mail is exchanged for additional processing steps. For example, modifications to the process would be obvious and straightforward for private posts, postal authorities and single corporations with multiple sites that are integrated. In fact the methods described also would be practical and desirable for a very large site with many production operations such as inserting and sorting for many clients.

An important part of the existing postal network includes private organizations that perform processing operations on the mail prior to submitting this mail to the Postal Authority. The work performed may include adding barcodes; sorting the mail according to Postal Authority regulations and other value add operations. In return, the private organizations will receive postage discounts often referred to as "work share" discounts for the work performed.

FIG. 1 schematically depicts a generic sorting operation that is modeled after a Presort Bureau. In other alternative implementations, any sorting operation could be configured into the consolidation network of sites. A Presort Bureau could be a separate business or department or any facility in the private sector that uses a sorter to commingle mail from multiple sources. Each of these bureaus contains one or more letter or flat mail sorters 21 and 216 that automatically process the mail into mail trays or tubs that are then aggregated onto pallets and placed in mail carriers 24. Each of the service bureaus 25 receives mail from mail piece production facilities 26, for example, from production equipment 20 on customer sites, such as inserters. These production facilities 26 are frequently referred to as letter shops, service bureaus or "captive shops" that manufacture the mail. The input mail received in containers 19 from the production process 20 may be unsorted, not barcoded nor have postage affixed. These mail containers may contain trays or tubs of mail and maybe some sort of a cart or a pallet. The sorting operations that follow production will add missing barcodes, perform sorting operations and affix postage indicia.

In the example, the site 25 includes two similar sorting systems 21*a*, 21*b*, although there may be fewer or more systems, or the systems may differ somewhat.

Mail comes into the Service Bureau 25 in batches distinguishable by client, which may also be distinguishable by one or more of class, postage affixed, weight, and automation compatibility. These batches are divided up among one or more sorters to perform the first pass sorting operation. One or more trays of mail are loaded on one of the feeders 10 where the mail will be cingulated and entered into the machine one piece at a time.

Data is captured regarding mail piece characteristics which effect postage due, such as thickness, weight, type of postage, etc. Some or all of this data may be entered by the operator or automatically measured or read off one or more of the mail pieces in first pass sorting and tracked with each mail piece throughout each subsequent pass.

The equipment operator will enter the description of the mail being loaded on the feeder, into the sorter controller 18. The data could include but is not limited to client, expected number of pieces, class of mail, postage affixed, piece weight and thickness. Alternately, similar data will be loaded as a data file into the sorter computer 18 from the site data processor 22. The data is received from the production facility or production equipment and transferred to the site data processor. The data processor will transfer the necessary data to the correct sorter where the specific mail will be processed based on prior allocation or based on operator command. Sorter control sort schemes are established for each sorter based on the mail that is to be processed on each individual sorter. The sort schemes can be entered by the operator or downloaded from the data processor 22. Since the mail is run in batches during first pass, mail pieces in the batch can be associated with operator entered data or downloaded data and included in the data file for each mail piece in the batch.

Each mail piece is imaged by element 11 either the whole front of the mail piece or in a specific area of interest and processed for barcodes, address data and other parameters such as indicia. Each mail piece is assigned a unique identification that will be used to track the mail piece through each additional processing step. This unique ID is established by a combination of Postnet, Planet, OneCode or Inserter control barcodes or other unique identifiers that were extracted form the mail piece image. If no distinguishing data can be read from the mail piece, then an ID may be assigned and/or printed on the mail piece by the printer 14. The barcode data or address data, which defines the delivery point, is used with the sort scheme to control sorting in the sort bins 16.

As noted above, parametric data may be measured for each mail piece, which can then be appended to the data file that generated for each piece in the sorter computer. In one example length and height are measured from image analysis or with photo sensors, thickness is measured with a separate sensor 12, and a scale 13 measures weight to categorize each piece into the correct Postal Authority weight class. The weight can also be used to calculate actual weight for purposes of postage calculation or verification where applicable. The weight could also be used to measure and report tray weight, pallet weight or mailing weight.

The printer station 14 is used to print the ZIPCODE, planet code, and unique identifier or endorsement line data. A marker system 15 can be used to mark the edge of a mail piece to signify a tray or tub break in order to enhance mail piece tracking between different processing steps. Accurate sweeping of the mail into the tray will improve tracking throughout future steps. As sorted collections of mail are swept into trays or other containers, the operator will scan the tray identification or enter the tray identification through the graphical user interface, e.g. each time he or she starts or completes a tray. As discussed more, later, the data processing will associate the tray identification with mail piece records for the mail purportedly swept into the particular container. The exact accuracy of the association of each mail piece to a container will vary with the system implementation. In the examples, at most, the tracking accuracy may off by one tray or so, for pieces at or around the break points.

The sorter computer 18 controls the sorting operation and maintains the data record associated with each mail piece. The mail pieces will be sorted, based on the 11-digit ZIPCODE, into groups of 5-digit trays, which correspond to Associate Offices (local delivery), into 3-digit trays, which correspond to Processing and Distribution Centers (P&DC-regional) and into Area Automated Distribution Centers (AADC) trays (groups of P&DCs). The mixed AADC trays represent residual mail pieces where less 150 mail pieces were found that matched 3-digit or AADC sortation rules. The tray tag printer 17 is used to print either a Postal Authority tray tag or an intermediate unique tray tag that will be used in staging the trays for subsequent pass or mail consolidation pass sortation.

The sorting is done based on the Postnet barcode, address block barcode or address lookup in the national address database after the address has been OCRed. Additional barcodes such as 4-state or PDF-417 or any other form of coded symbology or RFID may be used in the future for sorting control. Reading technologies for Radio Frequency Identification (RFID) tags or RFID codes imbedded in the paper can be added to read the required data directly from the code or read an unique identifier from the code that can be referenced to an electronic file to acquire the necessary data about the mail piece. A larger RFID code can be used to directly contain descriptive data about the mail piece, thus avoiding a data lookup. Alternatively, RFID sensitive ink can be used to mark the mail piece for identification. RFID codes can be used on mail piece, tray and tub tags and pallets. Both the paper, the ink and the detectors are available from INKODE Corporation. Similar tags may be used on or otherwise associated with mail containers, such as trays, tubs, sacks or pallets, for identification purposes discussed in more detail, later.

Since the largest discount is for 5-digit sortation, the Presorter has an incentive to combine the maximum amount of mail to create the maximum number of 5-digit trays. In many cases there is sufficient mail introduced into the feeder during first pass to create 5 digit trays. In this case the first pass sort scheme will allocate individual sort bins 16 to that 5-digit ZIPCODE. However, if it is not known before first pass processing starts that sufficient 5-digit mail exists, the sort bins will be allocated to 3-digit, AADC and residual mail. The site data processor 22 receives the data for each mail piece and the sortation results for each sorter 21 located on site. In normal single sorter operations, the sort computer 18 will analyze the first pass counts to determine if any of the 3-digit, AADC and mixed AADC trays can be combined to create additional 5-digit or 3-digit trays. If additional trays can be created, subsequent sortation runs will be made with different sort schemes. In the case of multiple sorters on site, the site data processor 22 will use the data from each sorter computer 18 to combine counts and create unique sort schemes for subsequent sortation passes on these machines. The 5-digit trays will be separated from the sort bin output 24. The remainder of the mail will be staged at the correct sorter for the subsequent sortation pass 23. Steps A1 through A16 in FIG. 6 define the required processing steps.

An alternative approach is proposed where subsequent sortation passes will be bypassed or non 5-digit trays from subsequent passes will be collected and not delivered to the Postal Authority but will be sent to a mail consolidation service where additional sortation can be performed and additional 5-digit trays can be created. A cooperative network of sites that performs sorting in support of each other or an independent mail consolidation service that serves as a clearinghouse for mail consolidation pass sortation among competitors can perform these mail consolidation services. All data associated with each competitor's operation would be strictly controlled to maintain confidentially. For the independent mail consolidation operation, the site data processor 22 will communicate with the mail consolidation data processor 27 at independent mail consolidation location or alternately with the site data processors at member sites.

This approach further defines the extensive mail piece tracking that must accompany any mail consolidation pass processing by an offsite mail consolidation location in order to satisfy the Postal Authority and the individual clients 20 that all mail pieces are accounted for and delivered to the Postal Authority and that postage due and client postage cost are accurately accounted for.

FIG. 2 is a schematic of the cooperative mail consolidation process, for the mail and data transfers that would occur in a low-density region or where the members are also not competitors. The zipcode ranges and geographic locations are for illustration only since many variations are possible. In fact, these sites will frequently be associated with rural locations versus metropolitan. For this example there are three sorting sites 30, 31, 32 that are processing mail based on ZIPCODE breaks in accordance with Postal Authority regulations (the 5-digit, 3-digit and AADC sorting). Additional sorting refinement is required beyond the normal sort schemes since all mail that does not fall within the 3-digit range associated with the local P&DCs 35 will be sorted based on the ZIPCODE range associated with mail consolidation members.

In one embodiment, each sorting location 25 will initially perform only first pass sorting, therefore the groupings of mail that are scheduled to be shipped to a mail consolidation member may not be sorted to the level of tray breaks shown in 36, 37, 41, 42, 46, 47 but only to the three digit or range of three digits. In alternate embodiments, only select zip code ranges will be transferred to the mail consolidation member, in which case some mail may be sorted to subsequent pass at sorting location 25 and some would be sorted in a mail consolidation pass at location 30, 31, or 32. Either the sort computer 18 (only one sorter at the site) or the site data processor 22 will perform that analysis of first pass results that is needed to segregate the sortation results and individual mail piece data to create the data set that will be integrated with the mail consolidation mail received from members to generate the final mailing report given to the Postal Authority when the mail is submitted.

In this case only national mail would be shared with mail consolidation members. It is possible that in addition to the mail that is transferred between members, the data files and ID associated with every mail piece that will be transferred is collected in the site data processor 22 and sent via an external network to the appropriate mail consolidation member data processor 27. The data could also be sent on a storage medium such as a DVD and accompany the mail transfer. Summary data would still be sent via the network so that the remote site can perform the necessary planning before the mail arrives.

Figure 4:
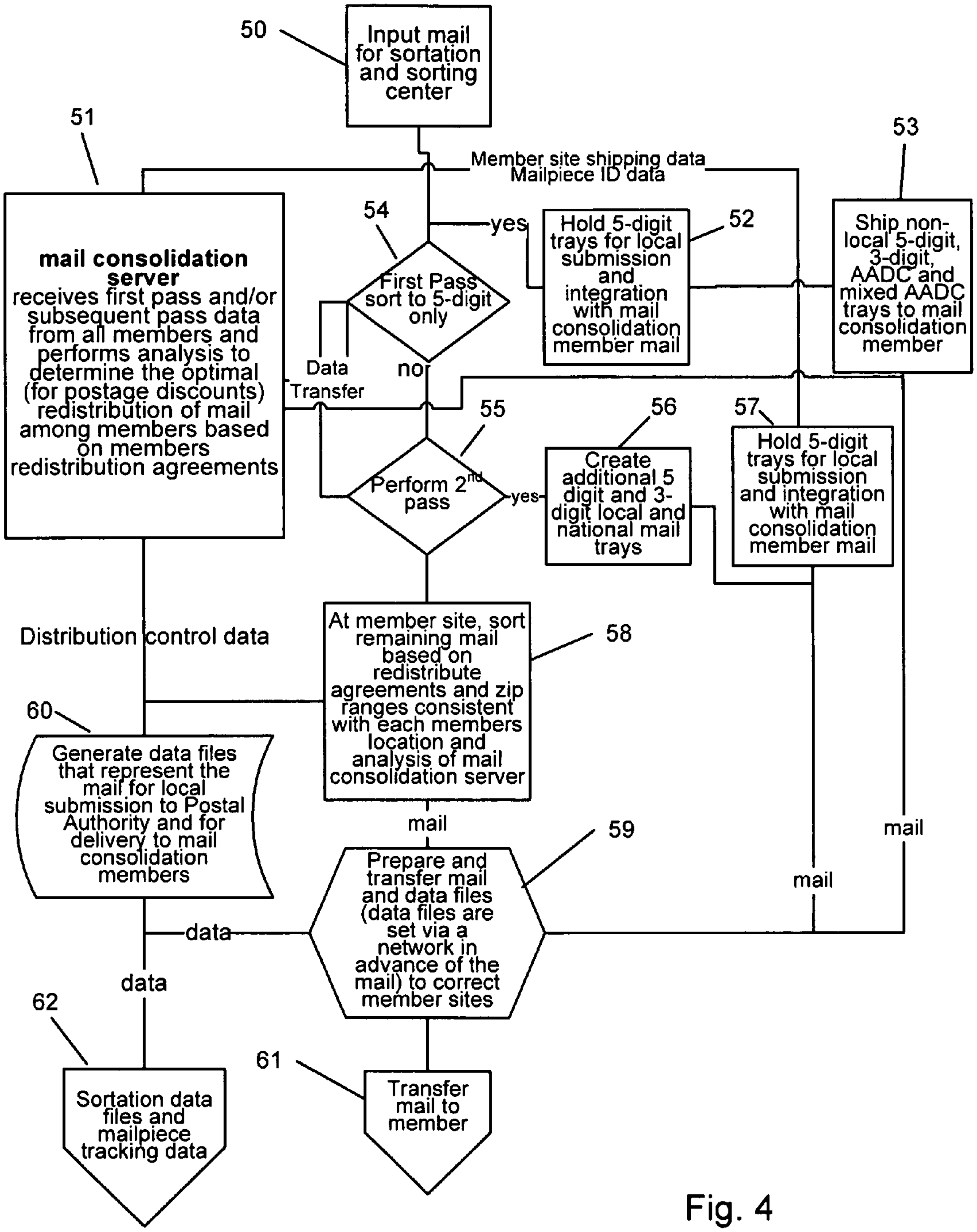
FIG. 4 is a flow chart illustrating cooperative mail consolidation mail preparation, which details the preferred implementation of sortation and data process steps to be performed by cooperative mail consolidation members.

FIG. 4 details the preferred implementation of sortation and data process steps to be performed by cooperative mail consolidation members. Numerous alternative agreements beyond what is described in FIG. 4 can be reached for how to share mail sortation processing among members. Mail is received from each site's clients or from on-site production 50. A decision is made if the site will only sort to 5 digits on a single pass 54 and skip subsequent pass sortation or perform the subsequent passes 55 in order to create the maximum number of 5-digit and 3-digit trays. If subsequent passes are skipped the site will typically have local 5-digit trays 52 that will be combined with mail from member sites during the mail consolidation sortation pass. All of the other mail 53 will be transported to mail consolidation members for mail consolidation processing. The results of first pass processing will be reported to the mail consolidation data processor 51 (not shown in FIG. 2). The mail consolidation data processor 51 can be a stand-alone data processor at a remote location or on a member's site. Alternately the mail consolidation data processor function could be performed in a distribute fashion using the resources of each member's site data processor. If the mail consolidation agreement allows or the mail consolidation data processor analysis determines that all non-local mail can not be economically processed by members, then a subsequent or subsequent pass 55 will be performed to create addition 5 and 3 digit trays of local and national mail 56. If a portion of the mail 57 is still needed by members to earn additional postage, that mail will be shipped to members. Sort schemes other than those required by the Postal Authority may be used to prepare the mail for shipment to member sites 58. The mail consolidation data processor 51 collects all of the sortation data from each processing step plus the mail piece parametric identification data needed for later reconciliation of where each mail piece was dispatched to the Postal Authority in the mail consolidation network. The mail 59 and data 60 is prepared and sent to the correct mail consolidation member.

Once the mail and data has arrived at the member site (Pittsburgh 30) from the member sites 31 and 32 the mail consolidation pass operation will begin. The data files are used to set up sort schemes in advance. When the mail is run through the sorter in the final preparation step the imaging or barcode read will be used to verify that all pallets, trays and mail pieces that were transferred to the site arrived and were processed for dispatch to the Postal Authority. These tracking requirements and processes are defined in FIGS. 6 thru 11. This mail consolidation process provides better accountability of mail piece integrity and postage payment verification than the current co-mingling rules for Presorters. Financial reconciliation for the member and their clients will be defined based on the postage savings minus processing fees. This reconciliation will be performed based on the specific savings achieved for the exact mail volume received by the member.

Figure 5:
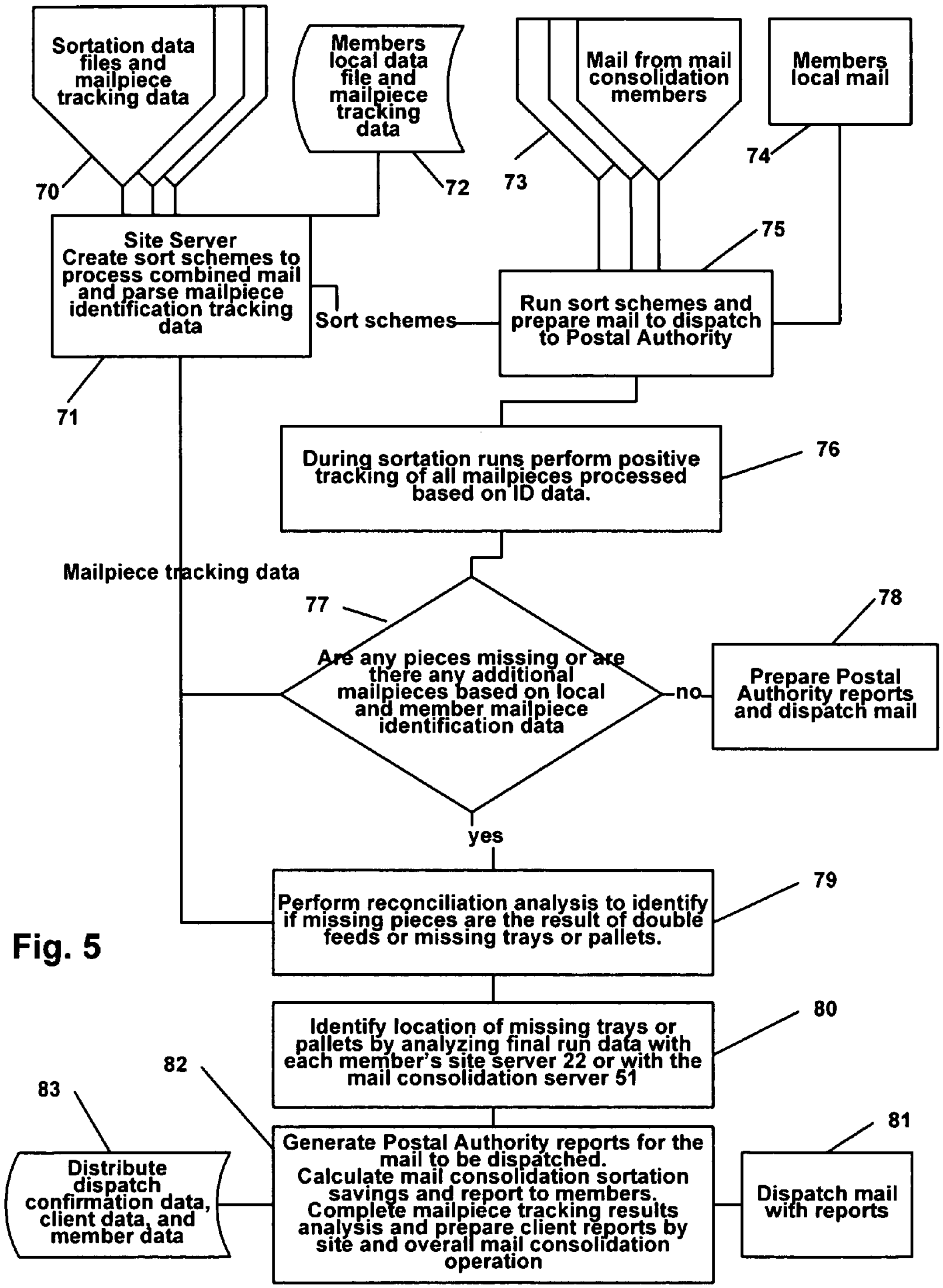
FIG. 5 depicts mail consolidation member mail sortation and shows the processing steps performed at the mail consolidation member site when the mail and data files are received.

FIG. 5 defines the processing steps performed at the mail consolidation member site when the mail and data files 73 and 70 are received. The data files from the local processing 72 are combined with the mail consolidation data 70 to create the mail consolidation sort schemes 71 for each sorter to control the mail consolidation sortation process 75. During the sorting operation, the imaging system or wide area barcode reader will be used to identify every piece of mail that is processed 76. The processed mail piece data is then compared with the ID data collected locally or received from members to account for every piece of mail that was supposed to be processed on the mail consolidation pass sortation 77. If all mail pieces are accounted for within the error limits allowed by the Postal Authority for double feeds, then the mail and accompanying reports will be dispatched 78 to the Postal Authority for delivery. If errors are detected, then the site data processor 71 will analyze the data by comparing expected IDs with actual mail pieces processed to recognize patterns that would indicate which trays, group of trays or pallet or containers of mail are missing 79. Similarly, additional mail pieces that are processed will be analyzed to determine their makeup and probable origin. Each member site will query the other member site data processors or the mail consolidation data processor 80 to reconcile the errors and generate accurate reports for all members. The final processing steps are to generate the final Postal Authority reports, calculate the mail consolidation sortation postage savings for each member that provided mail and to complete any tracking reports needed by members or clients to demonstrate that all of the mail was dispatched for delivery 82.

FIG. 3 is the schematic for Presorters that are in a competitive situation where an independent mail consolidation location will be established that is not affiliated with any of its members. Typically this would occur in a dense geographic area like Chicago. Most of the processing steps are the same as previously described except each of the members 51, 52, 53 would process all of their client mail through multiple sorting passes to create all of the possible qualifying 5-digit trays. They would create a mailing statement to reflect this mail and dispatch the mail to the Postal Authority. All of the residual 3-digit, AADC and mixed AADC mail trays along with the associated data files will be sent to the independent mail consolidation site 56. Alternately, the members may choose to send all of their sorted mail to the mail consolidation site to avoid the effort associated with dispatching their mail to the Postal Authority. A member site may be required to ship some 5-digit trays to the mail consolidation site in order to meet qualifying minimums of at least 150 mail pieces per 5-digit wedge of mail. These requirements will be decided by analysis performed in the mail consolidation data processor 27 based on the mail piece data files that are transferred at the completion of first pass at the member sorting location. In a manner similar to FIG. 2, independent mail consolidation sites 56 and 54 may exchange data and mail 55 in order to take advantage of higher densities of local ZIPCODEs in different regions. Most of the process steps in FIGS. 4 and 5 are applicable to the independent mail consolidation operations. The major difference is the independent mail consolidation site will not process mail that it has received directly from a mail production facility.

Figure 6:
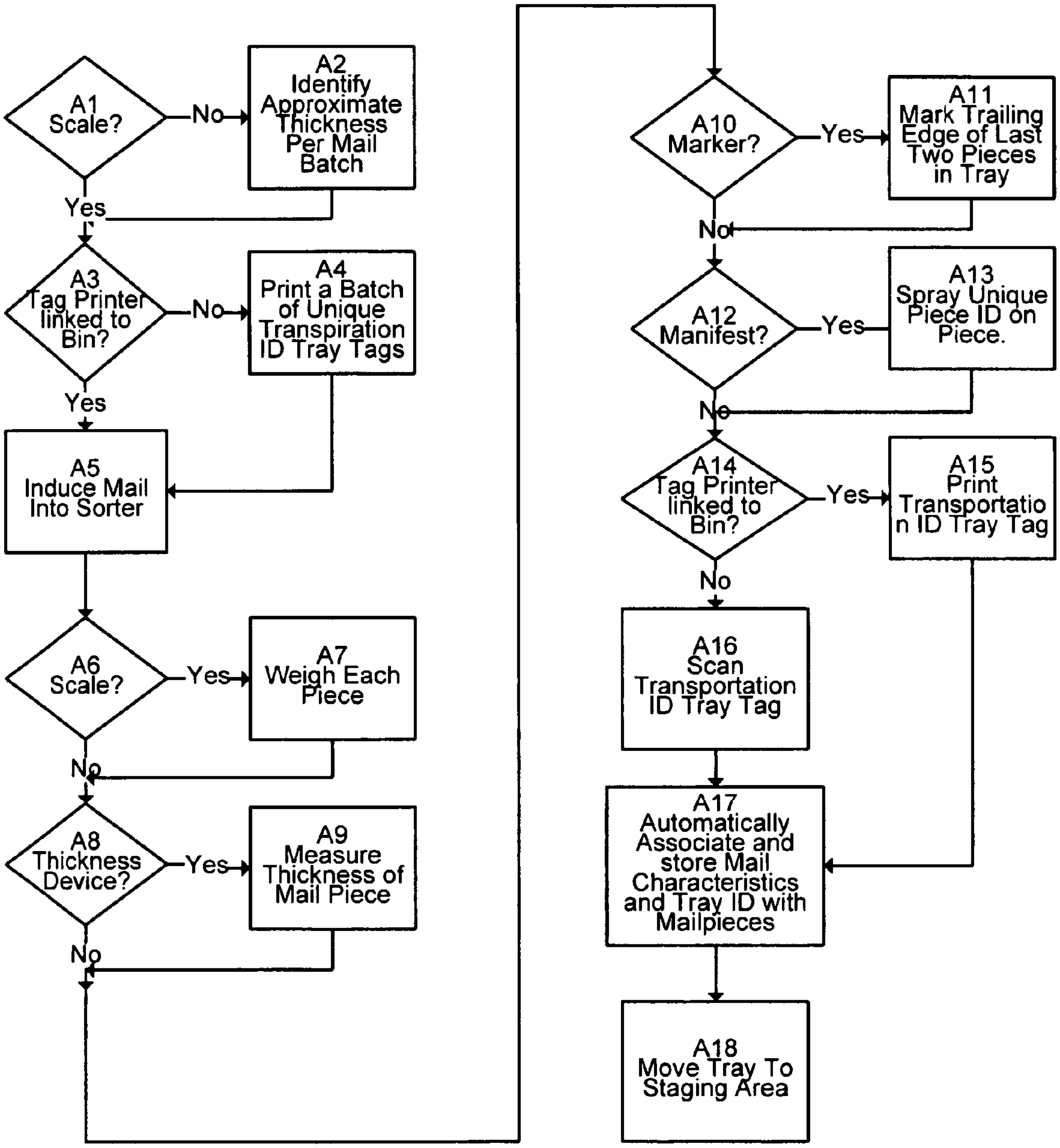
FIG. 6 depicts a logic flow for a first sorting pass representing how mail is sorted and specific piece characteristics are accumulated.
Figure 7:
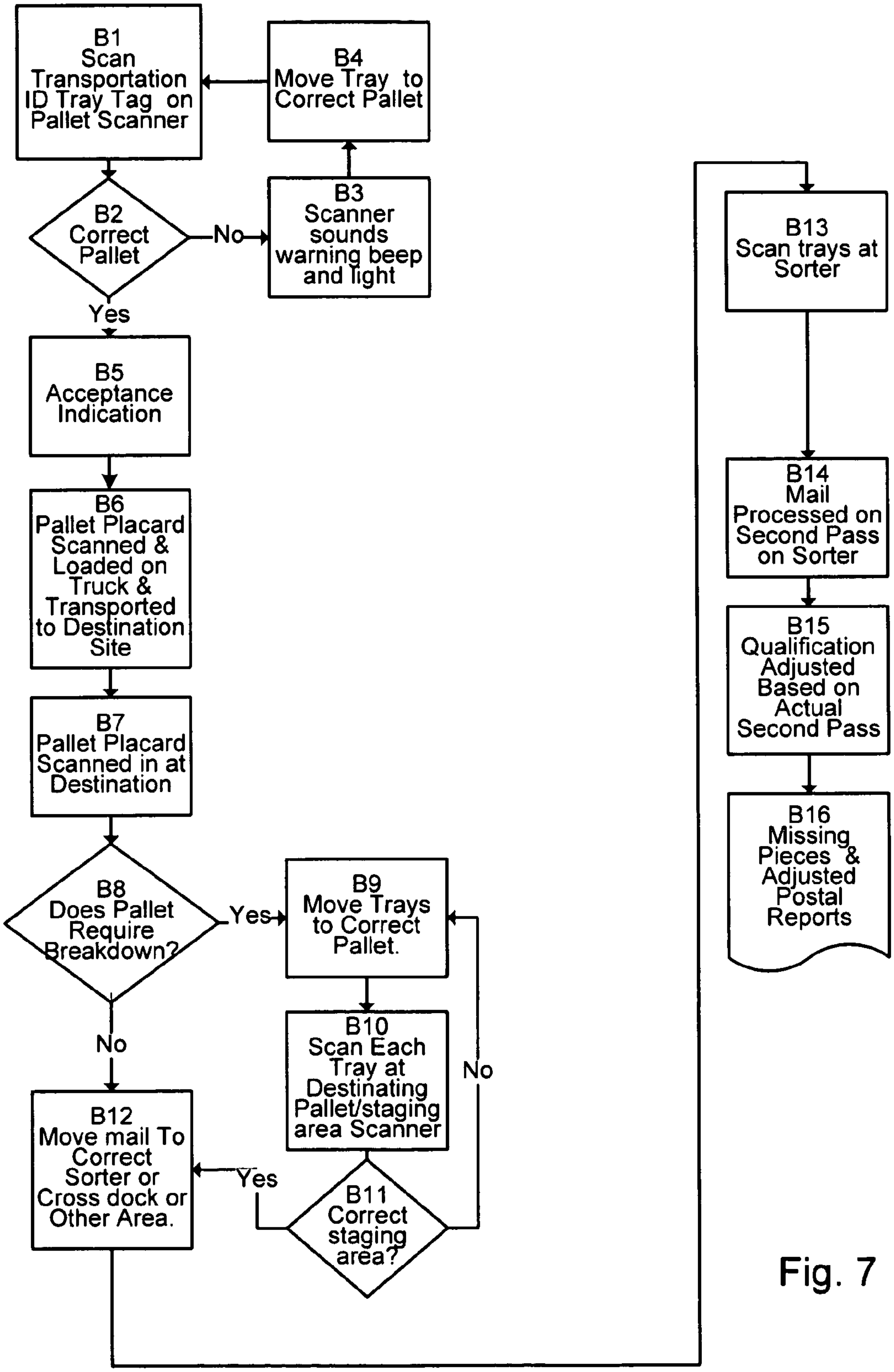
FIG. 7 depicts a logic flow for subsequent sorting passes including identifying how mail and tray flow is validated after first pass through subsequent passes.

This section identifies the processing steps and flow logic presented in FIGS. 6 and 2.

The process introduces a new way to prepare a mailing on one or more sorters through a series of optional devices, which measure, mark and track mail pieces through the sorting process in a single or multiple site operation. Where mechanical measuring apparatus are not present, manual methods of measuring the mail are presented. Tray content is actual if a marker apparatus is present or estimated if no apparatus is present. The scanning of the tag id and association with mail pieces is the key to tracking the mail in this process.

Table 1 below provides a detailed description of each process block in FIG. 6.

TABLE 1

Figure 8:
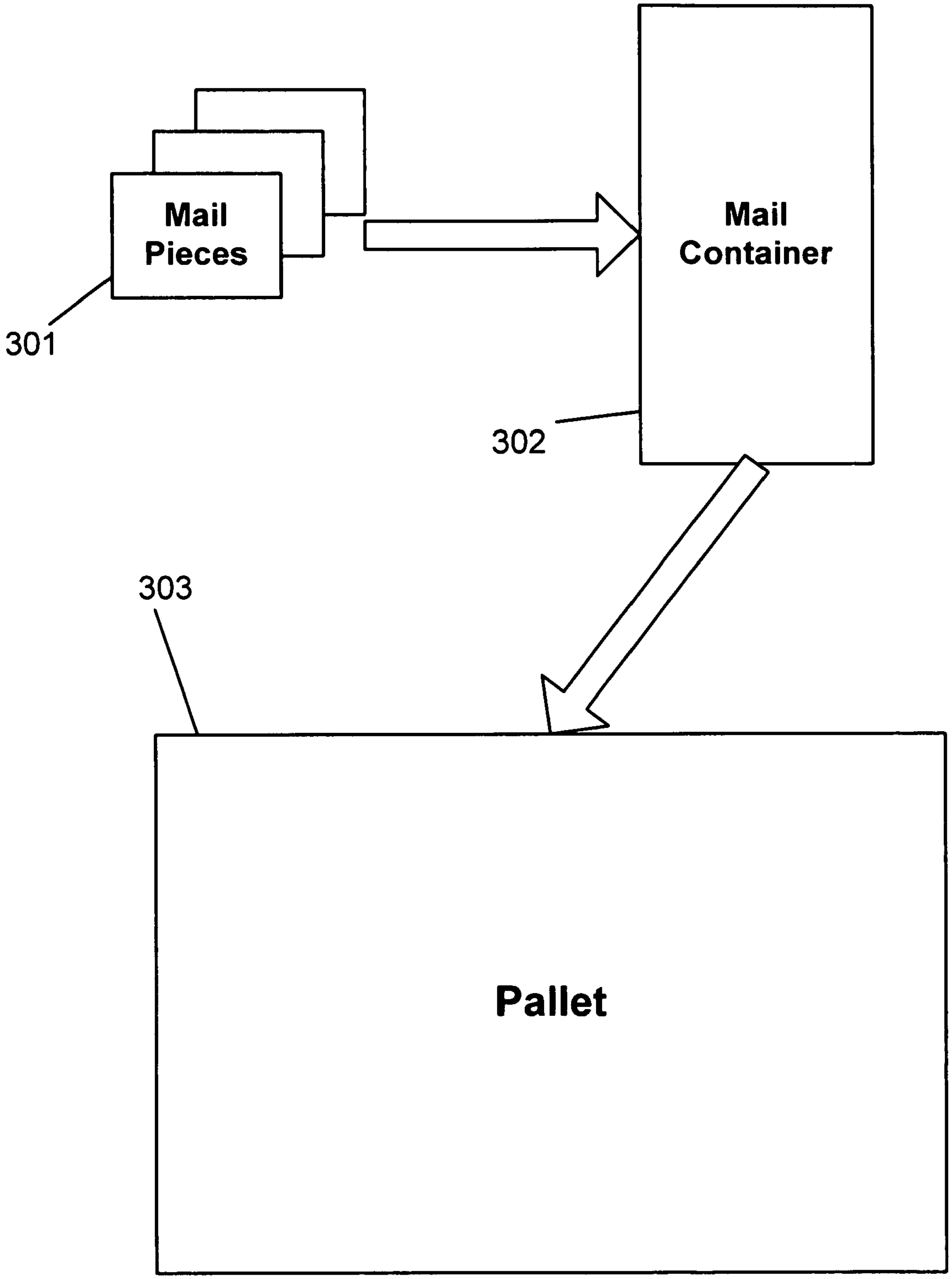
FIG. 8 illustrates a process of mail piece packaging and shows the graphic relationship of a mail piece to a tray to a pallet.
Figure 10:
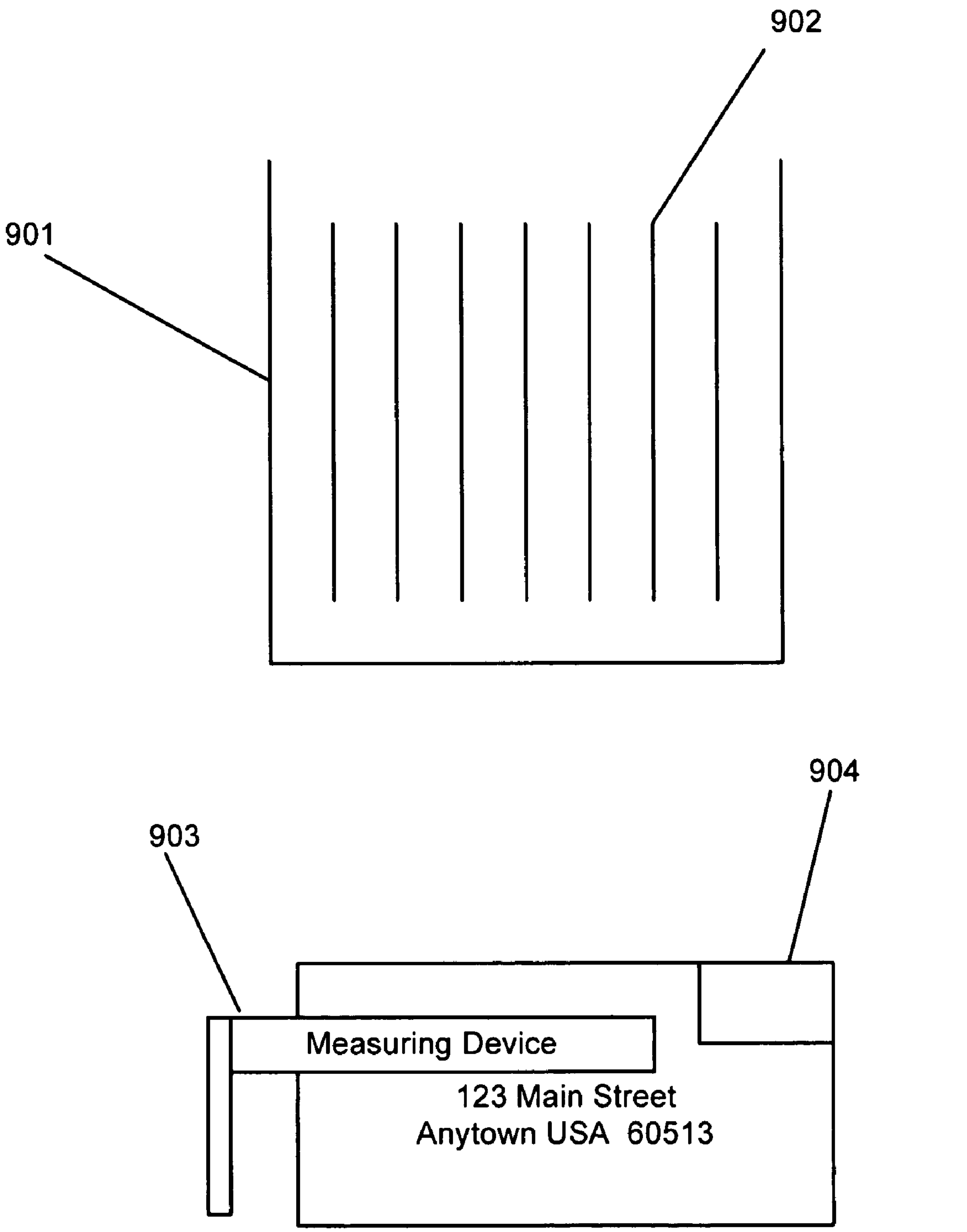
FIG. 10 shows a measurement system and illustrates two methods of measuring mail piece thickness.

| ID | Description |
|---|---|
| A1 | Does the sorter have thickness measuring device? The thickness of each piece will be used to measure when a mail container is full. This measurement could come from a thickness device on the sorter 903 to measure each piece 904 or sample every Xth piece as illustrated in FIG. 10. |
| A2 | Each stream can be set up one time or the thickness can be entered in at the time the mail is run using the following methods. The user could also enter the piece thickness into a computer system at any time before the mail is run. FIG. 10 illustrates how the user could also calculate the thickness of each piece 902 by filling a predefined space with mail pieces 901 and then dividing the known thickness of the measuring device 901 by the number of pieces that fit into the device. This calculation could be done by the operator or could be calculated by a computer where the predefined thickness is entered at some point, and then the number of pieces that fit within said predefined area is entered into the computer. |
| A3 | Is there a tray tag printer linked to each bin? A tray could be any mail container including, but not limited to a tray, tub, sack or an APC. |
| A4 | If there is not an on-demand tag printer that is linked to each bin, print a batch of barcoded tray tags. Each barcode will identify the destination site and have a unique id number assigned. Text will also be printed on the tag stating the origin site, bin, and destinating site and location for this tray in the destinating site. The location could be a staging area, sorter, sort scheme, or cross-dock location. The pre-printed Tags will be placed in a sleeve in the appropriate bin and used as needed in subsequent mailings. |
| A5 | Mail is fed into the sorter. |
| A5a | Image and read the mail piece and any combination of bar codes or any type of piece identification including, but not limited to Planet code, Postnet code, inserter control code, 4-state, 2D, or any form of text on the mail piece. |
| A6 | Is there a scale on the sorter? |
| A7 | Weigh and store the weight of each piece. |
| A8 | Is there a Thickness Measurement Apparatus 903 on The Sorter? FIG. 10 illustrates a mail thickness measuring device. |
| A9 | Measure the thickness of each piece 903. |
| A10 | 'Is the sorter equipped with a marking apparatus? |
| A11 | The system will keep track of the thickness of each piece of 301 mail by maintaining a thickness counter for each bin. FIG. 8 illustrates the relationship of mail pieces 301 to trays 302. When two feet, or the equivalent of one tray of mail is fed into a bin, the last one or more pieces will be automatically marked on the edge of the piece or wherever on the piece is convenient and visible. After a tray 302 is considered full and one or more pieces marked, the thickness counter will be reset to 0 for that bin. This mark will notify the sweeper that the tray is full and should be removed from the system. The SW will know exactly which pieces are in each tray. |
| A12 | This system will account for pieces by 11 digit zip codes or by a applying a unique sequential piece id on each piece. A unique piece id could already be printed on the piece by a process prior to being fed on the sorter. Is the manifest system activated? |
| A13 | If manifest is activated the existing unique id will be associated with this piece and stored in the electronic file with all the other mail piece characteristics, or if no unique id is present on the piece, the system will assign and apply the next sequential piece id in barcode and/or human readable format. |
| A14 | Is there a container tag printer linked to each bin? |
| A15 | Print a unique tray tag. The system will assign the mail in the bin to this unique tag number. |
| A16 | If there are no attached tag printers, the operator will scan one of the pre-printed batch of unique tags. The scanner will send this unique information back to the sorter computer where it will be associated with the mail pieces. |
| A17 | All data about each piece of mail will and each associated container will be stored in an electronic file. Data could include, but is not limited to customer information, postage affixed type or payment amount, weight, height, sequence number, unique piece id, thickness, etc. Each piece of data will be used in conjunction with the other data to form a unique set of characteristics or data about each piece. This unique set of data will be used in subsequent passes on a sorter to identify each specific piece. |
| A18 | The mail is then staged or moved to the transportation area. |

The mail has been sorted and trayed as outlined in FIG. 6 and explained in the prior text description. The exact accuracy of the tracking of each mail piece to a container may vary with system implementation, but in the example using a marker to identify the appropriate break points, the association may be precise in almost all cases. At most, the tracking accuracy may off by one tray or so, for pieces at or around the break points.

The trays are then moved to a staging area. The following process flow outlines the control and audit of the trays as they are moved to a subsequent pass in the same or different facility. The following Table 2 explains the process blocks summarized in FIG. 7.

TABLE 2

Figure 9:
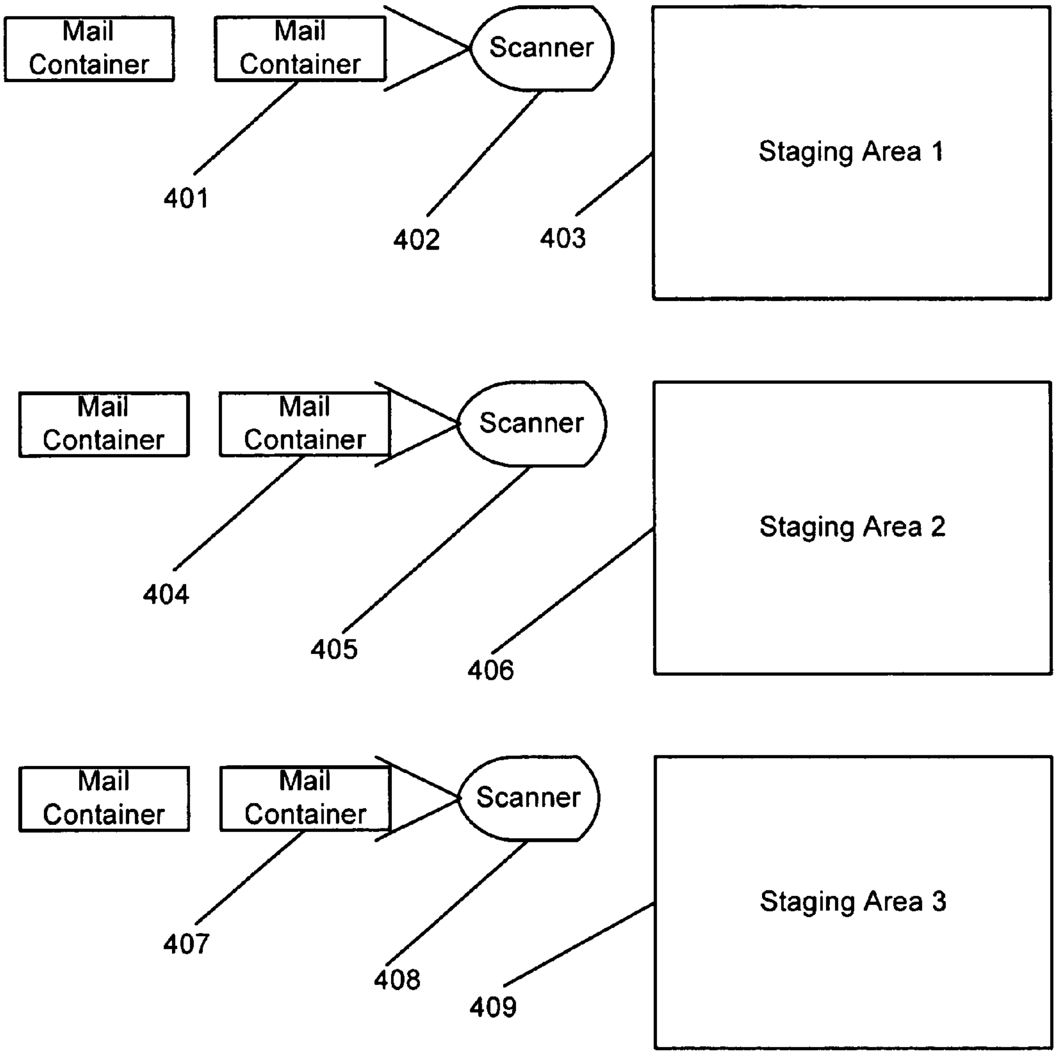
FIG. 9 is a flow chart illustrating a subsequent sorting pass, with mail piece staging requirements, and shows tray scanning as trays are moved from one stage to the next.

| ID | Description |
|---|---|
| B1 | FIG. 9 illustrates how each mail destination will have a staging area 403, 406, 409 and each staging area a separate scanner 402, 405, 408 at the origin location of the mail. Each mail destination might be in the same location or in a different location. The scanner can be mounted or hand held. Each scanner will only accept trays 401 of mail that are placed on the correct pallet. FIG. 8 illustrates the relationship of trays 302 to pallets 303. This will be determined by the computer system, which has a list of which trays 401 belong on which pallet 403. Each tray of mail will be scanned before it is placed on the pallet. If a conveyor is used, the tag will be scanned and the tray recorded and automatically routed to the correct staging area. There will be staging areas for mail that will be shipped to another location for consolidation as well as mail that will be dropped locally. |
| B2 | If the tray of mail is scanned at a scanner/pallet/staging area that not correct, go to B3. |
| B3 | Each tray destination will have a staging area. If a tray is scanned at the incorrect staging area, the scanner or separate apparatus will give a warning indication that informs the operator that the tray does not belong on in that staging area. |
| B4 | The tray will be moved to the correct pallet. |
| B5 | An acceptance signal will indicate that the tray belongs in that staging area. |
| B6 | A generic pallet placard with a unique id number and the destinating site will be scanned and associated with the trays on that pallet. The system could also produce a pallet placard at this point also. The trays that have been scanned and associated pieces will be associated with the pallet. If the pallet is destined of another site, the mail is transported to the destinating site, else the mail will be dropped locally or drop shipped. The pallet may also be destined for subsequent pass within the same facility. |
| B7 | The pallet placard is scanned in at the destinating site indicating that all the trays scanned onto that pallet arrived. If the pallet |
| B8 | After the Pallet is scanned the system will determine where it needs to go and if its trays need to go to different points within the facility. If the pallet contents need to be separated, the system will notify the user of such. |
| B9 | The tray tag will indicate to which staging area the specific tray needs to be moved. If the tray tag does not have the next staging area indicated on it, the system will notify the operator where to place each tray. The tray will be moved the tray to the correct staging area. |
| B10 | Each destination will have a staging area. If a tray is scanned at the incorrect staging area, the scanner or separate apparatus will give a warning indication that informs the operator that the tray does not belong on in that staging area. |
| B11 | If the tray of mail is scanned at a scanner/pallet/staging area that not correct, go to B9. An acceptance signal will indicate that the tray belongs in that staging area. |
| B12 | The mail is then moved to the correct sorter or cross-dock or other area. If the pallet is not broken down, the entire pallet will be moved to the next point in the processing step. This could be another staging area or a sorter where the mail will be run in subsequent pass. |
| B13 | Each tray is scanned before the mail is placed into the feed station on the sorter. This can be accomplished with a hand held scanner or a fixed mount scanner. The tray could also be scanned as it moves along a conveyer to the sorter feed area. |
| B14 | Mail is run through subsequent pass on the sorter. A flag is set for each record in the DB indicating the piece was seem the subsequent time. |

TABLE 2-continued

| ID | Description |
|---|---|
| B15 | The qualification report will be adjusted based on actual mail piece counts seen in subsequent pass. If a new piece is introduced into the mailing at this point a new record will be created. If qualification changes, the user will be prompted what to do with the mail. The system will calculate the new qualification and postage by validating that all the mail piece records have the finalized pass flag set, which indicates the mail was sorted as expected. |
| B16 | Exception and adjusted postal reports are printed. |

Most postal authorities do not have an official method of identifying individual pieces. As such, the private industry is required to devise ways of establishing the identity of a mal piece being run on a mail sorter. The tracking techniques and the supporting technologies disclosed herein enable interpolation, that is to say the use of the data from the mail before and/or after a failed read or a small group of failed reads to positively identify one or more pieces that are not read, essentially by comparing actual data read in a subsequent path with the expected data from the electronic file. For example, if the piece count does not match the electronic file or a read occurs for an piece identification that is not in the database, then the piece is rejected as a double from the first pass sorting operation.

A mail sorting method, based on principles related to this interpolation technique involves reading data from each mail piece in a stream of mail pieces, for mail piece identification purposes. A record is created for each mail piece containing the data read from the respective mail piece as an identification for the respective mail piece. A first pass sorts the mail pieces from the stream into first collections. The method also involves indicating a result of the first sorting pass with regard to each respective mail pieces, in the record thereof. A subsequent pass performs sorting of the mail pieces from the first collections, into subsequent collections, based on intended destination information and in accordance with postal authority rules. The sorting in the subsequent pass includes reading the data from each of the mail pieces from the first collections that are sorted in that pass. Records of mail pieces from which data is read in the sorting in the subsequent pass are updated, to indicate finishing of sorting thereof through the subsequent pass. The records of mail pieces identified during subsequent pass sorting are processed to prepare a mail statement, reconciling mail pieces actually finished through the sorting in the subsequent pass.

The processing of the records of mail pieces identified during subsequent pass sorting, for example, can reflect any mail pieces added or lost between the sorting in the first pass and the sorting in the subsequent pass. In an example, the statement indicates postage due for delivery of finished mail pieces by a postal authority. In another example, the statement provides confirmation of presentations to a postal authority for delivery of the finished mail pieces.

Since reading of identification data is never 100%, but reconciliation of the mail processed needs to be 100% (USPS may allow 1 or 2% error) the adjacent piece processing is intended to help with the read rate issue. Since the mail in a tray is in the same order as the IDs are in the electronic file, if a piece read is missing it can reasonably be assumed that IDs missing either follows or precedes the last piece read. Unless the ID that is derived is later read the error rate associated with this assumption is very low.

It is also envisioned that, where unique piece tracking is done without any unique marking on the mail piece, it may be possible to actually identify a mail piece that is not otherwise uniquely identifiable upon reading in a subsequent pass, based on the data from one or more adjacent pieces. Such a mail sorting method might involve reading data from each mail piece in a stream of mail pieces for mail piece identification purposes and creating a record for each mail piece. The mail piece record contains data read from the respective mail piece as an identification for that mail piece. However, the identification data recorded for some but not all of the mail pieces is sufficient to uniquely identify respective mail pieces. Mail pieces are sorted in a first pass, and a result of the first sorting pass is indicated with regard to each respective mail pieces in the record of the respective mail piece. The sorting the mail pieces in a subsequent pass includes reading the data from each of the mail pieces from the first collections. This technique identifies a target mail piece sorted in the subsequent pass, for which the data read from the target mail piece is not sufficient to provide a unique identification, based on mail piece records selected in response to unique identifying data read from one or more mail pieces adjacent to the target mail piece.

Figure 11:
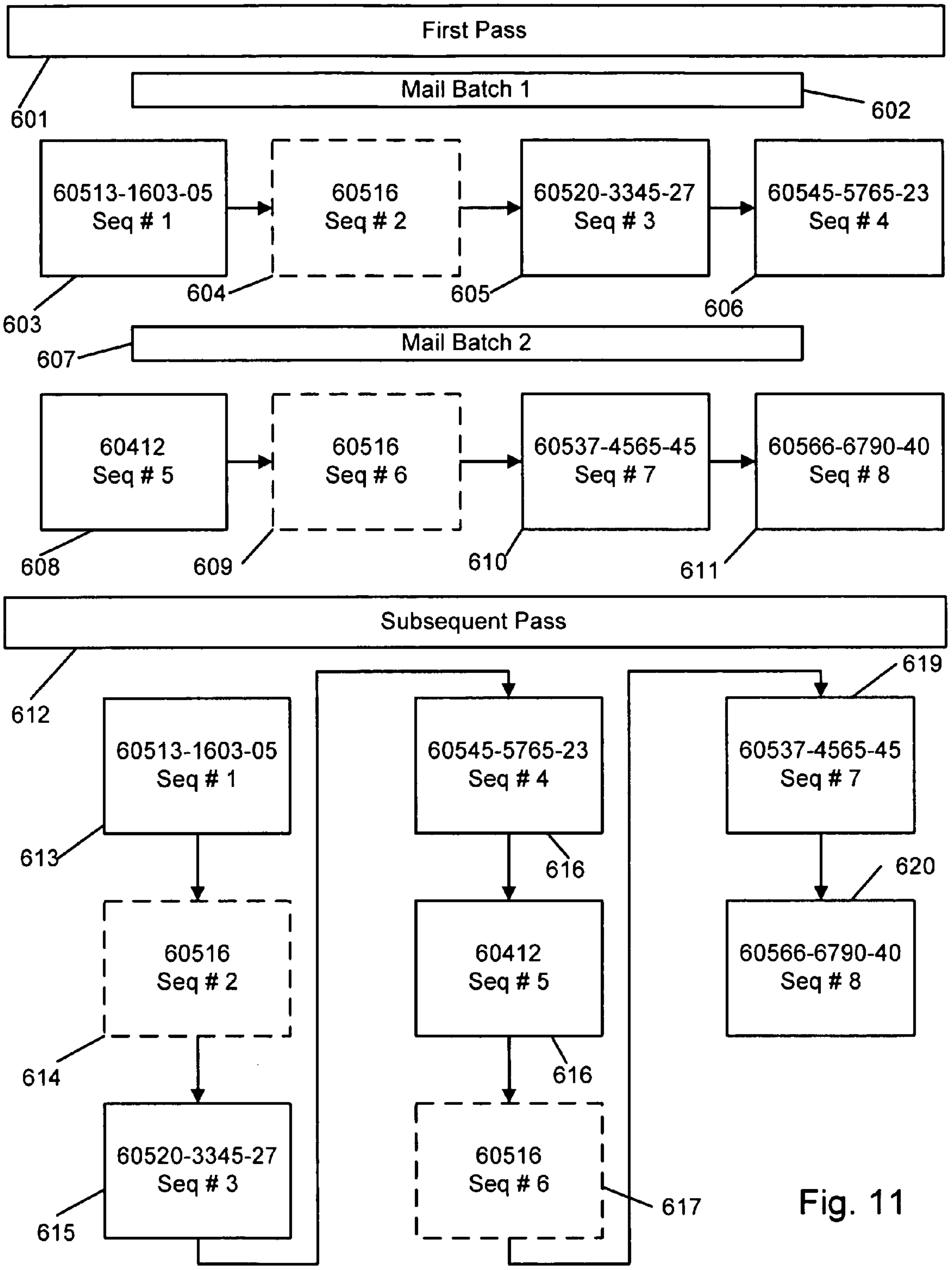
FIG. 11 illustrates a sort scheme hierarchy and mail piece flow through first and subsequent passes on a sorter.

FIG. 11 illustrates how two batches of mail might be run on a sorter, which may help in understanding this use of adjacent piece data to identify an unreadable piece. This illustration is by no means the only way that mail could be presented to and run on a sorter. This algorithm will determine the identity of a mail piece based on the identity of its adjacent pieces. This algorithm can be used by itself or in addition to the other tray management algorithms mentioned in this disclosure.

To accomplish this, the mail is run in batches 602, 607 during first pass 601. Before a batch 602 is run, the operator will enter into the sorter computer 18 the profile and/or mail piece characteristics of the subsequent mail batch. The profile could be a customer or key word that is associated with data stored in the computer that identifies but is not limited to the weight or weight category, postage affixed and postage affixed type, and class of mail. The mail will be fed and processed on the sorter 25 and sorted to a sort bin 16. All of the pieces in this example will sort into the same bin. The first piece 603 fed into the sorter 25 will be the first piece in the bin 16. The next piece 604 fed will be adjacent to the first piece fed 603. Each subsequent piece will follow the prior piece into the bin.

The data from each mail piece will cause a record to be created and saved on either the sorter computer 18 or the site data processor computer 22. Each piece record will contain, but is not limited to as much of the zip code was resolved, the mail piece customer and profile or key pointing to the mail piece customer and profile, the mail piece characteristics or a key pointing to the mail piece characteristics, a date and time stamp, a flag indicating that the piece was finished on the sorter and a sequence number. FIG. 11 lists the resulting zip code from each piece that was processed on the sorter in the order they were fed into the sorter. The first piece 603 was resolved to an 11-digit zip code 60513-1603-05. The next piece that was fed into the sorter 604 was only resolved to a five digit zip code 60513. The third piece 605 resolved to 60520-3345-27. The last piece of mail was fed 606 and processed by the sorter and the data stored in the computer. The operator will then select the profile or characteristics for the next batch of mail 607 and enter this data into the sort computer 18. The first piece of mail 608 is fed into the sorter and resolved to the five-digit zip code 60412. The next piece 609 is fed and resolved to 60516. The subsequent pieces 610, 611 are fed in and resolved to eleven digit zip codes.

All the mail from our sample is now in one bin. The operator will remove this mail from the bin and store it in a staging area until it will be run in a subsequent pass. This mail could be run in a subsequent pass in the same facility or a different facility depending on the operation. When the mail is run in the subsequent pass 612 for fine sorting and finishing, each piece will be fed into the sorter and processed. Typically, since the mail was commingled in first pass it would not be cost effective to stop the sorter between each small batch of mail and enter the characteristics into the computer again. Thus the mail is fed into the sorter continuously and the computer will only know the zip code that is read from the mail piece. The mail piece characteristics typically are not known at this point in the processing.

This algorithm defines how mail can be identified and reconciled in subsequent passes 612 on the sorter in the event that there is not a unique id on each piece. The id referenced could be a postal code or planet code or other code or numeric sequence printed on the envelope. This process could be performed in-line while the mail is being processed, or the data could be stored on a computers hard drive and processed later. It is understood that this algorithm will not resolve 100% of the pieces. The objective of this algorithm is to flag each piece record that was created during first pass as finished on the sorter. The computer can then reconcile and adjust the postal reports using the records that are flagged as complete and produce a report and data file of mail piece records that could not be reconciled. New pieces that are introduced in subsequent passes will have a new record created with a new piece flag set in the computer. They will be sorted and will be reported as new pieces. Postal reports will assume that these pieces are permit mail with no postage affixed.

This enables reconciliation at the second site to confirm that all mail that was intended to be shipped to that site is received and processed and that no additional mail was processed that was unexpected. Tracking can then trace to the pallet, to the tray, to the piece and to the intended sorter that was selected to run the sort scheme appropriate to the mail in question. Mail statements are prepared based on mail that is actually processed; and confirmation of dispatch to postal authority is provided to member sites and their clients as required. Postage due statements are updated in the mail statements for any added or missing pieces.

Since reading of identification data is never 100%, but reconciliation of the mail processed needs to be 100% (USPS may allow 1 or 2% error) the adjacent piece processing is intended to help with the read rate issue. Since the mail in a tray is in the same order as the IDs are in the electronic file, if a piece read is missing it can reasonably be assumed that IDs missing either follows or precedes the last piece read. Unless the ID that is derived is later read the error rate associated with this assumption is very low.

Optionally, the process would first parse through the data. In the event that there are two or more mail piece records 603, 613 with the same id and they are both read by the sorters reading device in the final subsequent pass, both piece record flags will be marked as finished. This process will be run on all records, changing the finished flag to true until all mail piece records that could be marked complete where the number of mail piece records in the electronic file match the number of pieces processed on the sorter for each duplicate id.

The pieces run in subsequent pass where there is not a unique id on every piece can be resolved by expanding the identification of the piece to include the one or more mail pieces directly before or after target piece 614. The sequence may be different in that the mail pieces were processed in one order 603, 604, 605, 606 in first pass, and in a different order in subsequent 612 pass 606, 605, 604, 603. In this case the target piece 614 has a non-unique id 60516. Piece 617 also has the same id 60516.

The process will first look at the piece directly before or after the subsequent pass 612 target piece 614, in this case piece 613 has id 60513-1603-05. Since the target piece 614 has the piece 613 with an id of 60513-1603-05 next to it and data record 604 has a piece 603 which also has an id of 60513-1603-05 next to it and the other target piece 617 does not have id 60513-1603-05 either before or after it, the process will assume 614 and piece 604 are one in the same. The flag for mail piece record 604 will be set to "finished". The system could then assume that since both subsequent pass piece 617 is the only subsequent pass piece remaining with an id of 60516 and first pass mail piece record 609 is the only first pass record without a "finished" flag set that these two are one in the same and mail piece record "finished" flag will be set to true.

If a greater level of certainty was desired for subsequent pass mail piece 617, The subsequent pass 612 mail pieces before and/or after 616, 619 could be compared to the first pass 601 mail piece records 608, 610 before and after the target record 609 and if one or more of them are the same, a positive match could be made. If the pieces adjacent to the target piece were the same for multiple batches, this process might look at the second and third piece before and/or after the target piece until a unique match was made.

The pieces in subsequent pass may be in a different order than the mail piece records from first pass such as 603, 604, 605, 606. There may be situations where the sorter operator changed the sequence by grabbing a handful of mail immediately next to the target piece 604, causing the order to change 605, 606, 604, 603. The matching algorithm will try to match the additional pieces on either side of the subsequent pass target piece until a unique combination is made that can be matched to the first pass mail piece record set. The algorithm could also ignore the sequence of the adjacent pieces and develop nonconsecutive groups of pieces that are in the subsequent pass mail near the target piece and also in the same first pass mail batch.

In this scenario, each mail piece will have a unique id on the envelope. The id can be in the form of any type of barcode code or human readable characters or numbers. The unique id can be applied to the mail piece by a device on the sorter or it can be applied by another device before the mail comes to the sorter. A separate record will be created in the computer system electronic file for each mail piece that is fed into the sorter. Each mail piece record will contain mail piece characteristics, data about any type of barcode that the sorter read of the mail piece, a unique piece id, and a finished mail flag. The purpose of the finished mail flag is to ensure that once a piece is fed into the sorter and a record created in the electronic file, that the piece is sorted to postal regulations. A mail piece could also be lost, destroyed or misrouted, thus causing the piece to not be placed into the correct mail storage container for the postal authority.

When each mail piece is processed on the sorter in subsequent pass, a reading device will read the unique piece id. The id will be looked up in the first pass electronic file. If the mail piece is being sorted to a bin that satisfies the postal authorities sorting and mail piece requirements, the finished flag will be set to true. After the mail is finished being run, the first pass mail piece records with the finished flag set to true will be re-analyzed to postal rules. New sort schemes will be created if the new mail configuration needs to be sorted again to comply with postal authority rules. Mail piece records that do not have the finished flag set will be reported as missing.

A piece is considered finished when it has been fine sorted to a level that meets the postal authority's regulations. Since some postal regulations allow the mailer to select the depth of sort for a piece, an additional requirement for a piece will be considered final is when it has been sorted to a level selected by the mailer and satisfies the rules and regulations of the postal authority.

The above discussion and the accompanying drawings disclose many points that help improve processing of mail. Although the discussion above has focused largely on the methodologies, those skilled in the art will recognize that those methodologies may be embodied in specific equipment, systems or devices. Also, many of the operations described above may be carried out by execution of software, firmware, or microcode operating on processors or computers of any type used to provided programmed control for the various elements shown in the system drawings. Additionally, code for implementing such operations may be in the form of computer instruction in any form (e.g. source code, object code, interpreted code, etc. stored in or carried by any computer or machine readable medium.

Program aspects of the technology may be thought of a "products," typically in the form of executable code and/or associated data that is carried on or embodied in a type of machine readable medium. Media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software.

Terms regarding computer or machine "readable medium" (or media) as used herein therefore relate to any physical medium or transmission medium that participates in providing instructions or code or data to a processor for execution or processing. Such a medium may take many forms, including but not limited to, non-volatile media and volatile media as well as carrier wave and physical transmission media.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a number of acronyms to refer to various services, messages and system components. Although generally known, use of several of these acronyms is not strictly standardized in the art. For the convenience of the reader, the following list correlates terms to acronyms, as used in the detailed description above.

Area Automated Distribution Center (AADC)
Automated Postal Center (APC)
Digital Video Disk (DVD)
Identification (ID)
Multi-Line Optical Character Reader (MLOCR)
Optical Character Recognition (OCR)
Processing & Distribution Center (P&DC)
Radio Frequency Identification (RFID)
United States Postal Service (USPS)

What is claimed is:

1. A method of tracking mail pieces of a plurality of mail clients, during mail sortation operations, the method comprising steps of:

obtaining a unique identification of each respective mail piece from batches of mail pieces received from the plurality of mail clients, by:

(a) reading an image of each respective mail piece to obtain a unique feature to establish a unique identification, (b) for mail pieces from which the unique feature to establish a unique identification are obtained, establishing a unique identification based on the unique ID, and (c) for mail pieces from which the unique feature to establish a unique identification are not obtained, applying a unique identification, (d) so that each respective mail piece from the batches of mail pieces received from the mail clients has its unique identification thereon;

creating an individual record in an electronic file for each respective mail piece, including the unique identification of the respective mail piece;

processing the mail pieces from the batches of mail pieces from the mail clients through one or more sortations prior to delivery to a postal authority;

populating the individual mail piece records of the electronic file with sortation tracking information for tracking substantially all of the identified mail pieces individually through the one or more sortations prior to delivery to the postal authority; and generating a report using the populated individual mail records for substantially all of the mail pieces received from the plurality of mail clients.

2. The method of claim 1, wherein the unique identification of the respective mail piece included in each individual record comprises one or more barcodes or any other unique identifying mark read from the respective mail piece or a unique sequence number assigned to the respective mail piece.

3. The method of claim 1, wherein the information for tracking populated in each individual record comprises one or more of a tray identifier, a pallet identifier or staging area identifier, indicating a current location of the respective mail piece.

4. The method of claim 1, wherein the information for tracking populated in each individual record indicates whether or not the respective mail piece has finished final sortation.

5. The method of claim 1, wherein each individual record includes an association of the respective mail piece with one of the mail clients from which the respective mail piece originated.

6. The method of claim 1, wherein the step of populating of the mail piece records of the electronic file comprises:

receiving a unique identification of a mail tray into which each respective mail piece is likely sorted from among a plurality of identifications of mail trays into which the mail pieces are sorted after at least one of the sortations; and associating the received unique identification of the mail tray into which each respective mail piece is likely sorted with the record for the respective mail piece in the electronic file.

7. The method of claim 6, wherein the step of populating of the mail piece records of the electronic file further comprises:

receiving a unique identification of a pallet onto which a plurality of identified mail trays are loaded; and associating the received unique identification of the pallet with each record of a respective mail piece in the identified mail trays loaded onto the pallet.

8. The method of claim 6, wherein the step of populating of the mail piece records of the electronic file further comprises indicating whether or not each respective mail piece sorted into a tray has finished a final one of the sortations.

9. A method of tracking mail wherein mail pieces have been sorted into a plurality of collections and each of the collections has been loaded into a mail container, the method comprising steps of:

during sorting, reading an image of each respective mail piece to obtain a unique feature to establish a unique identification, for mail pieces from which the unique feature to establish a unique identification are obtained, establishing a unique identification based on the unique feature, and for mail pieces from which the unique feature to establish a unique identification are not obtained, applying a unique identification so that each respective mail piece of the collections has its unique identification thereon;

recording an association of the unique identification of each respective mail piece with an identification of the collection into which the respective mail piece is sorted;

storing a unique identification of each respective mail container;

recording an association of each respective collection with the unique identification of a mail container into which the respective collection is loaded;

loading a plurality of the mail containers onto a pallet;

recording an association of a unique identification of the pallet with unique identifications of the mail containers loaded onto the pallet;

validating identification of each mail container loaded onto the identified pallet, before transporting the pallet; and informing an operator if any mail container loaded onto the identified pallet contains mail that should not be transported with the pallet to a remote location.

10. The method of claim 9, wherein the loaded mail container is a filled container selected from the group consisting of: a mail tray, a mail sack and a mail tub.

11. The method of claim 9, further comprising receiving the unique identifications of at least a plurality of the mail containers from a barcode scanner having scanned identification tags on the plurality of the mail containers when each of the plurality of the mail containers.

12. The method of claim 11, further comprising receiving the unique identification of the pallet from a bar code scanner having scanned an identification tag on the pallet.

13. The method of claim 9, further comprising receiving at least some of the unique identifications of at least a plurality of the mail containers and the pallet via a keyboard input.

14. The method of claim 9, wherein the step of storing of the unique identification of each respective mail container occurs upon filling of the respective mail container by the loading of a sorted collection of mail pieces into the respective mail container.

15. The method of claim 9, further comprising recording an association of the unique identification of the pallet with the unique identifications of the mail pieces loaded into the one mail container, when the one mail container is loaded onto the pallet.

16. The method of claim 1, wherein the unique feature includes a barcode, address data, alphabetical and/or numeric printed data or indicia.

17. The method of claim 9, wherein the unique feature includes a barcode, address data alphabetical and/or numeric printed data or indicia.

* * * * *